US008854745B1

(12) United States Patent
Chen

(10) Patent No.: US 8,854,745 B1
(45) Date of Patent: Oct. 7, 2014

(54) IMAGING LENS ASSEMBLY

(71) Applicant: Largan Precision Co., Ltd., Taichung (TW)

(72) Inventor: Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 37 days.

(21) Appl. No.: 13/888,375

(22) Filed: May 7, 2013

(30) Foreign Application Priority Data

Apr. 25, 2013 (TW) .............................. 102114859 A

(51) Int. Cl.
G02B 9/62 (2006.01)
G02B 13/00 (2006.01)

(52) U.S. Cl.
CPC .............. G02B 13/0045 (2013.01); G02B 9/62 (2013.01)
USPC ........................................... 359/713; 359/757

(58) Field of Classification Search
CPC .............................. G02B 9/62; G02B 13/0045
USPC ........................... 359/658, 713, 754, 756–758
See application file for complete search history.

(56) References Cited

U.S. PATENT DOCUMENTS

| 7,869,142 | B2 | 1/2011 | Chen et al. | |
| 8,000,031 | B1 | 8/2011 | Tsai | |
| 2012/0229917 | A1 | 9/2012 | Huang | |
| 2012/0314301 | A1* | 12/2012 | Huang et al. | 359/713 |
| 2013/0050846 | A1* | 2/2013 | Huang | 359/713 |
| 2014/0153113 | A1* | 6/2014 | Tsai et al. | 359/713 |

* cited by examiner

Primary Examiner — Darryl J Collins
(74) Attorney, Agent, or Firm — CKC & Partners Co., Ltd.

(57) ABSTRACT

An imaging lens assembly includes, in order from an object side to an image side, a stop, a first lens element, a second lens element, a third lens element, a fourth lens element, a fifth lens element and a sixth lens element. The first lens element with positive refractive power has a convex object-side surface. The second lens element with negative refractive power has a concave image-side surface. The third lens element has refractive power. The fourth lens element has refractive power. The fifth lens element has refractive power. The sixth lens element with refractive power has a concave image-side surface at a paraxial region thereof, wherein the image-side surface of the sixth lens element has a convex shape at an off-axis region, and both of the surfaces of the sixth lens element are aspheric. The imaging lens assembly has a total of six non-cemented lens elements with refractive power.

19 Claims, 15 Drawing Sheets

IMAGING LENS ASSEMBLY

RELATED APPLICATIONS

The application claims priority to Taiwan Application Serial Number 102114859, filed Apr. 25, 2013, which is herein incorporated by reference.

BACKGROUND

1. Technical Field

The present disclosure relates to an imaging lens assembly. More particularly, the present disclosure relates to a compact imaging lens assembly applicable to the electronic products.

2. Description of Related Art

In recent years, with the popularity of mobile products having camera functionalities, the demand for miniaturized optical systems is increasing. The sensor of a conventional photographing camera is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional compact optical system employed in a portable electronic product mainly adopts a four-element lens structure, such as the U.S. Pat. No. 7,869,142 or a five-element lens structure, such as the U.S. Pat. No. 8,000,031. Due to the popularity of mobile products with high-end specifications, such as smart phones and PDAs (Personal Digital Assistants), the pixel and image-quality requirements of the compact optical system have been increasing rapidly. However, the conventional four-element or five-element lens structure cannot satisfy the requirements of the compact optical systems.

Another conventional compact optical system has six-element lens structure, such as the U.S. Publication No. 2012/0229917 A1. However, the refractive power of the first lens element is not favorable for reducing the total track length. Moreover, the surface shapes together with the allocation of stop are also not favorable for its light gathering capability. The illumination of the imaging lens assembly is thereby low resulting in worse image quality.

SUMMARY

According to one aspect of the present disclosure, an imaging lens assembly includes, in order from an object side to an image side, a first lens element, a second lens element, a third lens element, a fourth lens element, a fifth lens element and a sixth lens element. The first lens element with positive refractive power has a convex object-side surface. The second lens element with negative refractive power has a concave image-side surface. The third lens element has refractive power. The fourth lens element has refractive power. The fifth lens element has refractive power. The sixth lens element with refractive power has a concave image-side surface at a paraxial region thereof, wherein the image-side surface of the sixth lens element has a convex shape at an off-axis region thereof, and both of an object-side surface and the image-side surface of the sixth lens element are aspheric. The imaging lens assembly has a total of six non-cemented lens elements with refractive power and further includes at least one stop located between an imaged object and the first lens element. When a distance in parallel with an optical axis from a maximum effective diameter position on the object-side surface of the first lens element to an axial vertex on the object-side surface of the first lens element is SAG11, a shortest non-axial distance in a direction parallel with the optical axis between the object-side surface of the first lens element and the image-side surface of the first lens element is ET1, a curvature radius of an object-side surface of the second lens element is R3, a curvature radius of the image-side surface of the second lens element is R4, an axial distance between the fifth lens element and the sixth lens element is T56, and a central thickness of the sixth lens element is CT6, the following relationships are satisfied:

$1.75 < SAG11/ET1;$ $-0.2 < (R3+R4)/(R3-R4) < 5;$ and $0 < T56/CT6 < 0.65.$

According to another aspect of the present disclosure, an image capturing device having the imaging lens assembly according to said aspect includes an image sensor. The image sensor is for image formation.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
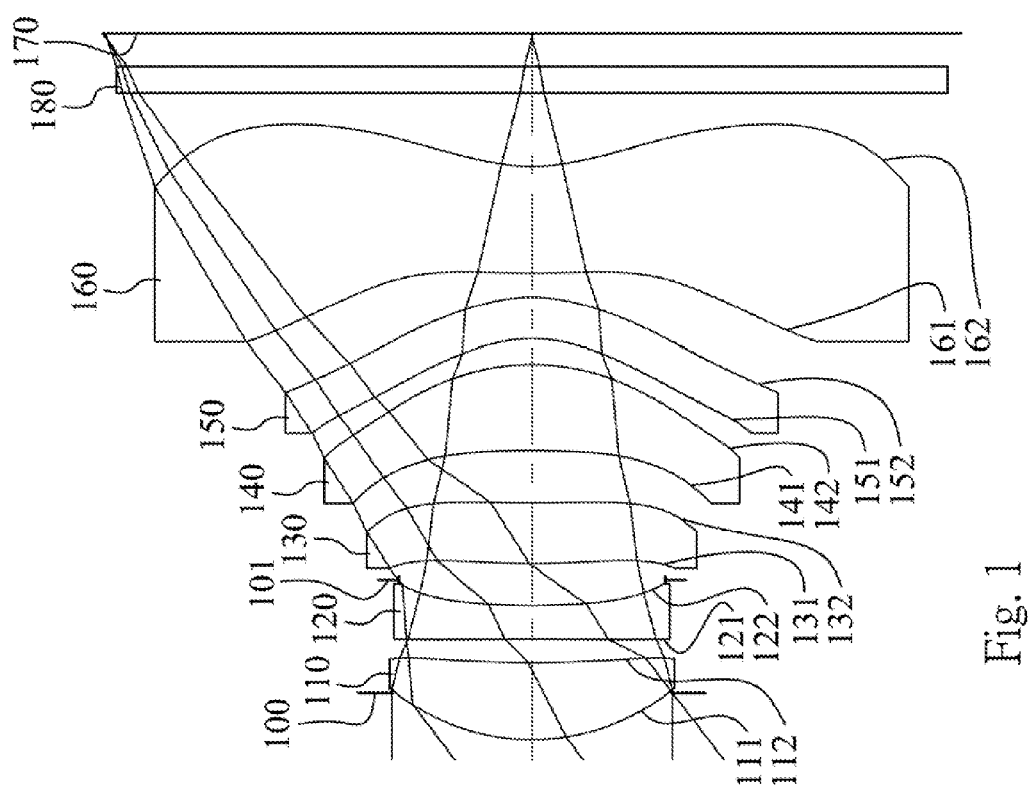
FIG. 1 is a schematic view of an imaging lens assembly according to the 1st embodiment of the present disclosure.

An imaging lens assembly includes, in order from an object side to an image side, a first lens element, a second lens element, a third lens element, a fourth lens element, a fifth lens element and a sixth lens element. The imaging lens assembly has six non-cemented lens elements with refractive power.

The imaging lens assembly has six non-cemented lens elements with refractive power. That is, any two lens elements adjacent to each other are not cemented, and there is an air space between the two lens elements. Moreover, the manufacturing process of the cemented lenses is more complex than the non-cemented lenses. In particular, a second surface of one lens and a first surface of the following lens need to have accurate curvature to ensure these two lens elements will be highly cemented. However, during the cementing process, those two lens elements might not be highly cemented due to displacement and it is thereby not favorable for the image quality of the imaging lens assembly. Therefore, the imaging lens assembly of the present disclosure provides six non-cemented lens elements for improving the problem generated by the cemented lens elements.

The imaging lens assembly further includes a stop, such as an aperture stop, which is located between an imaged object and the first lens element. The stop disposed between the imaged object and the first lens element is referred to as a front stop. The front stop can provide a longer distance between an exit pupil of the imaging lens assembly and the image plane and which improves the image-sensing efficiency of an image sensor.

The first lens element with positive refractive power has a convex object-side surface. Therefore, the total track length of the imaging lens assembly can be reduced by properly adjusting the positive refractive power of the first lens element.

The second lens element with negative refractive power can have a concave image-side surface, so that an aberration generated by the first lens element can be corrected.

The third lens element can have at least one inflection point formed on at least one of an object-side surface or an image-side surface of the third lens element. Accordingly, it is favorable for correcting the aberration of the off-axis.

The fourth lens element can have positive refractive power and a convex image-side surface, so that it is favorable for balancing the positive refractive power of the first lens element so as to avoid overloading the positive refractive power on one single lens element resulting in excessive spherical aberrations. It is thereby favorable for reducing the photosensitivity of the imaging lens assembly.

The sixth lens element can have a convex object-side surface and has a concave image-side surface at a paraxial region thereof, wherein the image-side surface of the sixth lens element has a convex shape at an off-axis region thereof. Accordingly, it is favorable for effectively correcting the astigmatism and reducing the back focal length so as to maintain a compact size thereof and correct the aberration of the off-axis.

When a distance in parallel with an optical axis from a maximum effective diameter position on the object-side surface of the first lens element to an axial vertex on the object-side surface of the first lens element is SAG11 (When the distance towards the object side of the imaging lens assembly is negative, and when the distance towards the image side of the imaging lens assembly is positive), and a shortest non-axial distance in parallel with the optical axis between the object-side surface of the first lens element and the image-side surface of the first lens element is ET1 (The range of ET1 is not limited to the effective area on both of the object-side surface and the image-side surface of the first lens element. In addition, ET1 is not referred to as an axial distance in parallel with the optical axis between the object-side surface of the first lens element and the image-side surface of the first lens element), the following relationship is satisfied: $1.75<\text{SAG11}/\text{ET1}$. Accordingly, it enables the imaging lens assembly to be equipped with particular surface shape and large aperture. It is thereby favorable for gathering the lights on the image plane so as to improve illumination. Preferably, the following relationship is satisfied: $1.85<\text{SAG11}/\text{ET1}<5.0$.

When a curvature radius of an object-side surface of the second lens element is R3, and a curvature radius of the image-side surface of the second lens element is R4, the following relationship is satisfied: $-0.2<(R3+R4)/(R3-R4)<5$. By such an arrangement, it is favorable for effectively correcting the aberration of the imaging lens assembly. Preferably, the following relationship is satisfied: $0.5<(R3+R4)/(R3-R4)<3.5$.

When an axial distance between the fifth lens element and the sixth lens element is T56, and a central thickness of the sixth lens element is CT6, the following relationship is satisfied: $0<T56/CT6<0.65$. Therefore, it is favorable for manufacturing and assembling the lens elements so as to increase the manufacturing yield rate. Preferably, the following relationship is satisfied: $0.05<T56/CT6<0.60$.

When a focal length of the first lens element is f1, a focal length of the second lens element is f2, a focal length of the third lens element is f3, a focal length of the fourth lens element is f4, a focal length of the fifth lens element is f5, and a focal length of the sixth lens element is f6, the following relationship is satisfied: $\Sigma |f1/fx|<3.0$, wherein $x=2\sim6$. Accordingly, it is favorable for balancing the distribution of the refractive power of the imaging lens assembly so as to effectively correct the aberration. Preferably, the following relationship is satisfied: $1.0<\Sigma |f1/fx|<2.75$, wherein $x=2\sim6$.

When a central thickness of the first lens element is CT1, and the shortest non-axial distance in parallel with the optical axis between the object-side surface of the first lens element and the image-side surface of the first lens element is ET1, the following relationship is satisfied: $2.2<CT1/ET1<4.5$. Therefore, it is favorable for manufacturing and molding the lens elements so as to increase the manufacturing yield rate.

When an Abbe number of the first lens element is V1, an Abbe number of the second lens element is V2, and an Abbe number of the fifth lens element is V5, the following relationship is satisfied: $0.7<(V2+V5)/V1<1.2$. Therefore, the chromatic aberration of the imaging lens assembly can be corrected.

When an axial distance between the object-side surface of the first lens element and the image plane is TTL, and the focal length of the imaging lens assembly is f, the following relationship is satisfied: $0.90<TTL/f<1.33$. Therefore, it is favorable for keeping a compact size for the imaging lens assembly.

When an f-number of the imaging lens assembly is Fno, the following relationship is satisfied: $1.6<Fno<2.2$. By such an arrangement, it is favorable for properly adjusting the size of aperture so as to enable the imaging lens assembly obtain large aperture. It is thereby favorable for taking sharp images under insufficient light conditions by fast shutter speed.

When a curvature radius of the image-side surface of the sixth lens element is R12, and the focal length of the imaging lens assembly is f, the is following relationship is satisfied:

0.15<R12/f<0.80. Therefore, it is favorable for reducing the back focal length of the imaging lens assembly so as to keep a compact size thereof.

When an axial distance between the second lens element and the third lens element is T23, and a central thickness of the second lens element is CT2, the following relationship is satisfied: 1.0<T23/CT2<3.0. Accordingly, it is favorable for manufacturing and assembling the lens elements so as to increase the manufacturing yield rate.

When the focal length of the imaging lens assembly is f, the focal length of the fifth lens element is f5, and the focal length of the sixth lens element is f6, the following relationship is satisfied: −2.0<(f/f5)+(f/f6)<−0.50. Therefore, it is favorable for reducing the aberration of the imaging lens assembly.

According to the imaging lens assembly of the present disclosure, there can be at least one stop provided between the first lens element and the image plane, such as an aperture stop, a glare stop, or a field stop. Said glare stop or said field stop is for eliminating the stray light and thereby improving the image quality thereof.

According to the imaging lens assembly of the present disclosure, the lens elements can be made of plastic or glass material. When the lens to elements are made of glass material, the distribution of the refractive power of the imaging lens assembly can be more flexible to design. When the lens elements are made of plastic material, the manufacturing cost thereof can be reduced. Furthermore, surfaces of each lens element can be arranged to be aspheric, because the aspheric surface of the lens element is easy to form a shape other than spherical surface so as to have more controllable variables for eliminating the aberration thereof, and to further reduce the required number of the lens elements. Thus, the total track length of the imaging lens assembly can be effectively reduced.

According to the imaging lens assembly of the present disclosure, each of an object-side surface and an image-side surface of every lens element has a paraxial region thereof and an off-axis region thereof. The paraxial region thereof refers to the region of the surface where light rays travel close to an optical axis and the off-axis region thereof refers to the region of the surface where light rays travel away from the optical axis. Particularly, when the lens element has a convex surface, it indicates that the surface is convex at the paraxial region thereof; and when the lens element has a concave surface, it indicates that the surface is concave at the paraxial region thereof.

According to the imaging lens assembly of the present disclosure, the imaging lens assembly is featured with good correction ability and high image quality, and can be applied to 3D (three-dimensional) image capturing applications, in products such as digital cameras, mobile devices and tablets.

According to the present disclosure, an image capturing device is provided. The image capturing device has the imaging lens assembly according to the aforementioned imaging lens assembly of the present disclosure, and the image capturing device includes an image sensor for image formation. Accordingly, the image capturing device is equipped with large aperture so as to obtain sufficient illumination for improving image quality.

According to the above description of the present disclosure, the following 1st-7th specific embodiments are provided for further explanation.

1st Embodiment

FIG. 1 is a schematic view of an imaging lens assembly according to the 1st embodiment of the present disclosure.

Figure 2:
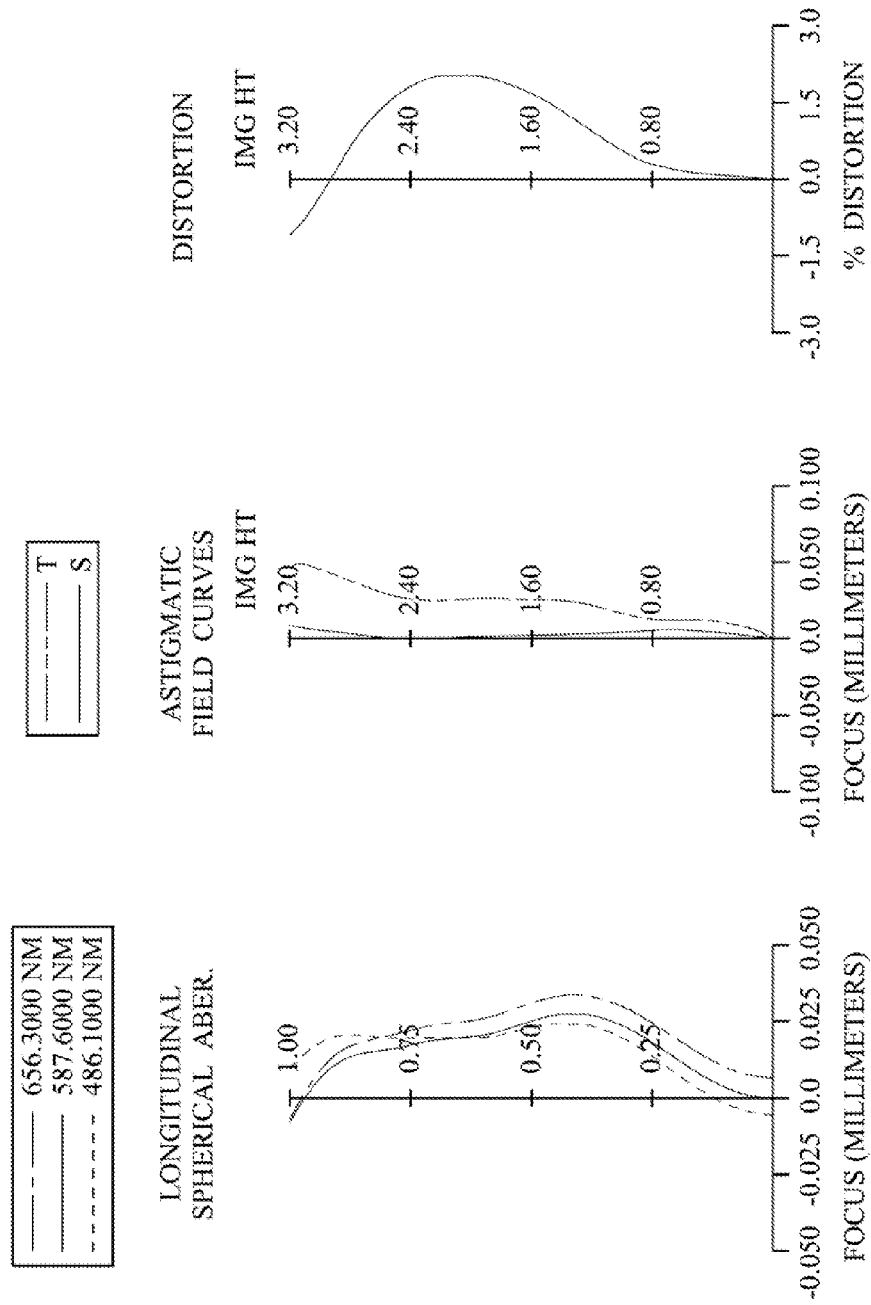
FIG. 2 shows spherical aberration curves, astigmatic field curves and a distortion curve of the imaging lens assembly according to the 1st embodiment.

FIG. 2 shows spherical aberration curves, astigmatic field curves and a distortion curve of the imaging lens assembly according to the 1st embodiment. In FIG. 1, the imaging lens assembly includes, in order from an object side to an image side, an aperture stop 100, a first lens element 110, a second lens element 120, a stop 101, a third lens element 130, a fourth lens element 140, a fifth lens element 150, a sixth lens element 160, an IR-cut filter 180 and an image plane 170, wherein the imaging lens assembly has a total of six non-cemented lens elements (110-160) with refractive power.

The first lens element 110 with positive refractive power has a convex object-side surface 111 and a concave image-side surface 112. The first lens element 110 is made of plastic material, and has the object-side surface 111 and the image-side surface 112 being both aspheric.

The second lens element 120 with negative refractive power has a concave object-side surface 121 and a concave image-side surface 122. The second lens element 120 is made of plastic material, and has the object-side surface 121 and the image-side surface 122 being both aspheric.

The third lens element 130 with positive refractive power has a convex object-side surface 131 and a concave image-side surface 132. The third lens element 130 is made of plastic material, and has the object-side surface 131 and the image-side surface 132 being both aspheric, wherein both of the object-side surface 131 and the image-side surface 132 of the third lens element 130 have at least one inflection point.

The fourth lens element 140 with positive refractive power has a concave object-side surface 141 and a convex image-side surface 142. The fourth lens element 140 is made of plastic material, and has the object-side surface 141 and the image-side surface 142 being both aspheric.

The fifth lens element 150 with positive refractive power has a concave object-side surface 151 and a convex image-side surface 152. The fifth lens element 150 is made of plastic material, and has the object-side surface 151 and the image-side surface 152 being both aspheric.

The sixth lens element 160 with negative refractive power has a convex object-side surface 161 and a concave image-side surface 162 at a paraxial region thereof, wherein the image-side surface 162 of the sixth lens element 160 has a convex shape at an off-axis region thereof. The sixth lens element 160 is made of plastic material, and has the object-side surface 161 and the image-side surface 162 being both aspheric.

The IR-cut filter 180 is made of glass material and located between the sixth lens element 160 and the image plane 170, and will not affect the focal length of the imaging lens assembly.

The equation of the aspheric surface profiles of the aforementioned lens elements of the 1st embodiment is expressed as follows:

$$X(Y)=(Y^2/R)(1+\text{sqrt}(1-(1+k)\times(Y/R)^2))+\Sigma(Ai)\times(Y^i)$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the imaging lens assembly according to the 1st embodiment, when a focal length of the imaging lens assembly is f, an f-number of the imaging lens assembly is Fno, and half of the maximal field of view of the imaging lens assembly is HFOV, these parameters have the following values: f=4.20 mm; Fno=2.00; and HFOV=37.5 degrees.

In the imaging lens assembly according to the 1st embodiment, when an Abbe number of the first lens element 110 is V1, an Abbe number of the second lens element 120 is V2, and an Abbe number of the fifth lens element 150 is V5, the following relationship is satisfied: (V2+V5)/V1=0.859.

Figure 15:
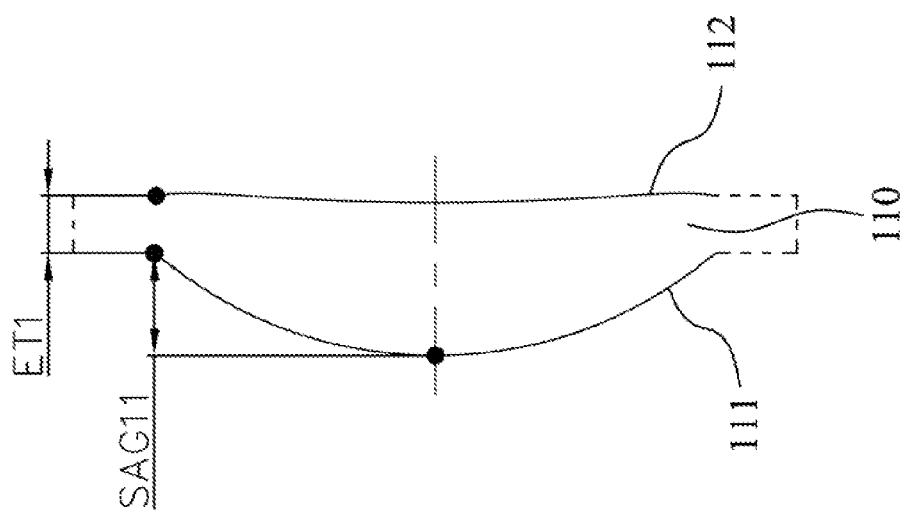
FIG. 15 shows SAG11 and ET1 of the first lens element of the imaging lens assembly according to the 1st embodiment.

FIG. 15 shows SAG11 and ET1 of the first lens element 110 of the imaging lens assembly according to FIG. 1. The dotted line of the first lens element 110 refers to the extension of the first lens element 110 which is outside of the effective area. In FIG. 15, a distance in parallel with an optical axis from a maximum effective diameter position on the object-side surface 111 to of the first lens element 110 to an axial vertex on the object-side surface 111 of the first lens element 110 is SAG11, a shortest non-axial distance in parallel with the optical axis between the object-side surface 111 of the first lens element 110 and the image-side surface 112 of the first lens element 110 is ET1 (In this embodiment, ET1 refers to a non-axial distance in a direction parallel with the optical axis from a maximum effective diameter position on the object-side surface 111 of the first lens element 110 to a maximum effective diameter position on the image-side surface 112 of the first lens element 110), and a central thickness of the first lens element 110 is CT1, the following relationships are satisfied: CT1/ET1=2.64; and SAG11/ET1=1.76.

In the imaging lens assembly according to the 1st embodiment, when an axial distance between the second lens element 120 and the third lens element 130 is T23, and a central thickness of the second lens element 120 is CT2, the following relationship is satisfied: T23/CT2=1.25.

In the imaging lens assembly according to the 1st embodiment, when an axial distance between the fifth lens element 150 and the sixth lens element 160 is T56, and a central thickness of the sixth lens element 160 is CT6, the following relationship is satisfied: T56/CT6=0.23.

In the imaging lens assembly according to the 1st embodiment, when a curvature radius of an object-side surface 121 of the second lens element 120 is R3, and a curvature radius of the image-side surface 122 of the second lens element 120 is R4, the following relationship is satisfied: (R3+R4)/(R3−R4)= 0.71.

In the imaging lens assembly according to the 1st embodiment, when a curvature radius of the image-side surface 162 of the sixth lens element 160 is to R12, and the focal length of the imaging lens assembly is f, the following relationship is satisfied: R12/F=0.32.

When a focal length of the first lens element 110 is f1, a focal length of the second lens element 120 is f2, a focal length of the third lens element 130 is f3, a focal length of the fourth lens element 140 is f4, a focal length of the fifth lens element 150 is f5, and a focal length of the sixth lens element 160 is f6, the following relationship is satisfied: $\Sigma|f1/fx|=2.87$, wherein x=2~6.

In the imaging lens assembly according to the 1st embodiment, when the focal length of the imaging lens assembly is f, the focal length of the fifth lens element 150 is f5, and the focal length of the sixth lens element 160 is f6, the following relationship is satisfied: (f/f5)+(f/f6)=−1.34.

In the imaging lens assembly according to the 1st embodiment, when an axial distance between the object-side surface 111 of the first lens element 110 and the image plane 170 is TTL, and the focal length of the imaging lens assembly is f, the following relationship is satisfied: TTL/f=1.26.

The detailed optical data of the 1st embodiment are shown in Table 1 and the aspheric surface data are shown in Table 2 below.

TABLE 1

1st Embodiment
f = 4.20 mm, Fno = 2.00, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.354 | | | | |
| 2 | Lens 1 | 1.653 | ASP | 0.583 | Plastic | 1.544 | 55.9 | 3.62 |
| 3 | | 8.988 | ASP | 0.176 | | | | |
| 4 | Lens 2 | −30.723 | ASP | 0.250 | Plastic | 1.650 | 21.4 | −6.83 |
| 5 | | 5.199 | ASP | 0.192 | | | | |
| 6 | Stop | Plano | | 0.120 | | | | |
| 7 | Lens 3 | 5.285 | ASP | 0.459 | Plastic | 1.544 | 55.9 | 16.15 |
| 8 | | 12.849 | ASP | 0.387 | | | | |
| 9 | Lens 4 | −7.768 | ASP | 0.648 | Plastic | 1.544 | 55.9 | 3.84 |
| 10 | | −1.696 | ASP | 0.194 | | | | |
| 11 | Lens 5 | −1.036 | ASP | 0.310 | Plastic | 1.607 | 26.6 | 300.22 |
| 12 | | −1.147 | ASP | 0.182 | | | | |
| 13 | Lens 6 | 9.033 | ASP | 0.799 | Plastic | 1.535 | 55.7 | −3.11 |
| 14 | | 1.362 | ASP | 0.550 | | | | |
| 15 | IR-cut filter | Plano | | 0.200 | Glass | 1.517 | 64.2 | — |
| 16 | | Plano | | 0.249 | | | | |
| 17 | Image | Plano | | — | | | | |

Note: Reference wavelength is 587.6 nm (d-line).

Note: Half of the effective diameter of the stop at Surface 6 is 1.000 mm.

TABLE 2

Aspheric Coefficients

| Surface # | 2 | 3 | 4 | 5 | 7 | 8 |
|---|---|---|---|---|---|---|
| k = | 1.5049E−01 | −1.2831E+01 | −7.4704E+00 | 5.6774E−02 | −1.9855E+01 | 4.9626E−01 |
| A4 = | −3.0206E−03 | −1.8421E−02 | −3.3099E−02 | −1.1246E−02 | −9.5412E−02 | −9.2398E−02 |
| A6 = | 9.9647E−04 | 3.2895E−02 | 1.7580E−01 | 1.5176E−01 | 6.8320E−02 | 4.5499E−02 |
| A8 = | 2.6939E−02 | −5.2196E−02 | −2.8338E−01 | −1.3762E−01 | −1.6552E−01 | −1.3718E−01 |
| A10 = | −7.7578E−02 | 7.2373E−02 | 3.2091E−01 | 1.0694E−01 | 2.2396E−01 | 1.5469E−01 |
| A12 = | 8.5860E−02 | −7.5173E−02 | −2.4184E−01 | −6.8831E−02 | −1.8414E−01 | −9.6138E−02 |
| A14 = | −3.7118E−02 | 2.0950E−02 | 7.7222E−02 | 3.3758E−02 | 5.9754E−02 | 2.3391E−02 |

| Surface # | 9 | 10 | 11 | 12 | 13 | 14 |
|---|---|---|---|---|---|---|
| k = | −1.0000E+00 | −5.1831E+00 | −1.9143E+00 | −2.1145E+00 | −1.9957E+01 | −7.5557E+00 |
| A4 = | −7.9954E−02 | −1.1670E−01 | 2.6190E−01 | 2.7140E−01 | −2.0648E+00 | −2.8796E−02 |
| A6 = | 5.0060E−02 | 1.7764E−02 | −5.1176E−01 | −4.5912E−01 | −5.4726E+00 | 2.1325E−03 |
| A8 = | −6.7397E−02 | 9.2065E−02 | 5.5323E−01 | 3.9386E−01 | 3.1240E+01 | 9.1347E−04 |
| A10 = | −2.0503E−02 | −1.3721E−01 | −3.3172E−01 | −1.8742E−01 | −5.7415E+01 | −3.6647E−04 |
| A12 = | 7.6842E−02 | 9.2230E−02 | 1.1176E−01 | 5.0851E−02 | 5.3442E+01 | 5.8341E−05 |
| A14 = | −4.5104E−02 | −2.9166E−02 | −1.9812E−02 | −7.3971E−03 | −2.5409E+01 | −4.9259E−06 |
| A16 = | 8.4584E−03 | 3.4606E−03 | 1.4174E−03 | 4.4847E−04 | 4.9277E+00 | 1.7746E−07 |

In Table 1, the curvature radius, the thickness and the focal length are shown in millimeters (mm). Surface numbers 0-17 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
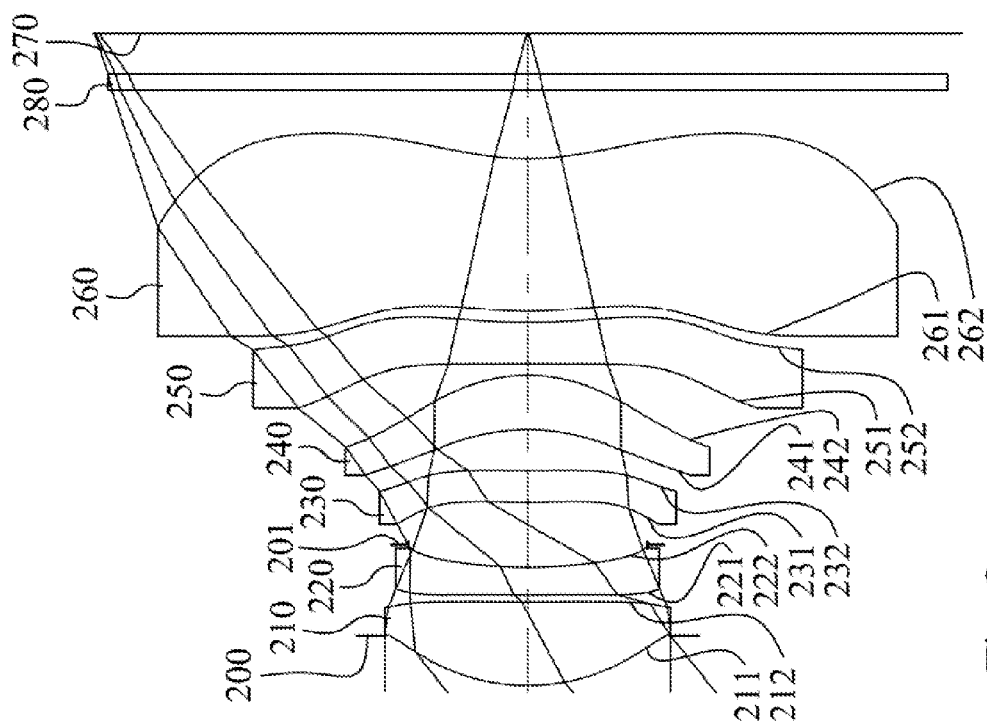
FIG. 3 is a schematic view of an imaging lens assembly according to the 2nd embodiment of the present disclosure.
Figure 4:
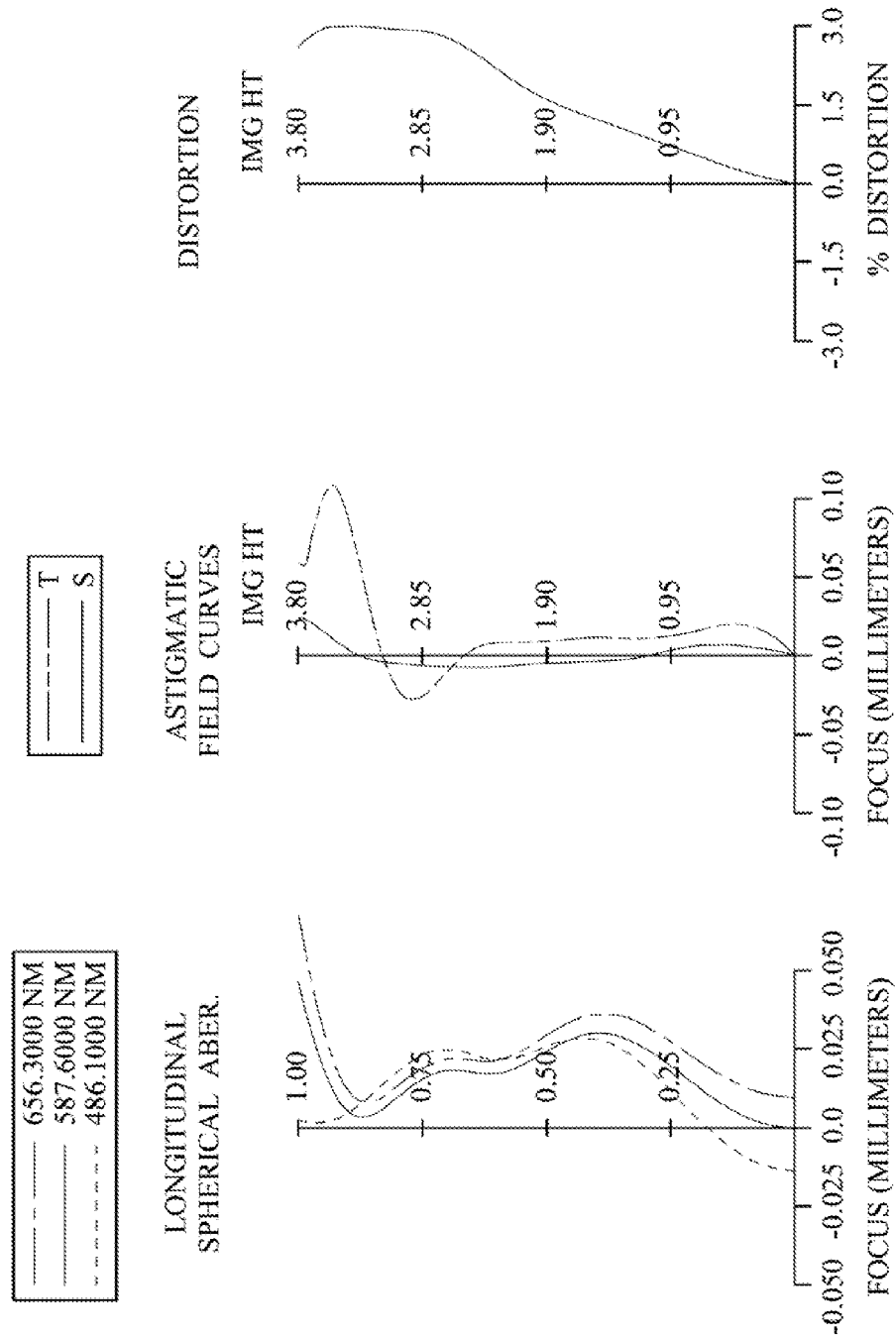
FIG. 4 shows spherical aberration curves, astigmatic field curves and a distortion curve of the imaging lens assembly according to the 2nd embodiment.

FIG. 3 is a schematic view of an imaging lens assembly according to the 2nd embodiment of the present disclosure. FIG. 4 shows spherical aberration curves, astigmatic field curves and a distortion curve of the imaging lens assembly according to the 2nd embodiment. In FIG. 3, the imaging lens assembly includes, in order from an object side to an image side, an aperture stop 200, a first lens element 210, a second lens element 220, a stop 201, a third lens element 230, a fourth lens element 240, a fifth lens element 250, a sixth lens element 260, an IR-cut filter 280 and an image plane 270, wherein the imaging lens assembly has a total of six non-cemented lens elements (210-260) with refractive power.

The first lens element 210 with positive refractive power has a convex object-side surface 211 and a concave image-side surface 212. The first lens element 210 is made of plastic material, and has the object-side surface 211 and the image-side surface 212 being both aspheric.

The second lens element 220 with negative refractive power has a convex object-side surface 221 and a concave image-side surface 222. The second lens element 220 is made of plastic material, and has the object-side surface 221 and the image-side surface 222 being both aspheric.

The third lens element 230 with positive refractive power has a convex object-side surface 231 and a concave image-side surface 232. The third lens element 230 is made of plastic material, and has the object-side surface 231 and the image-side surface 232 being both aspheric, wherein both of the object-side surface 231 and the image-side surface 232 of the third lens element 230 have at least one inflection point.

The fourth lens element 240 with positive refractive power has a concave object-side surface 241 and a convex image-side surface 242. The fourth lens element 240 is made of plastic material, and has the object-side surface 241 and the image-side surface 242 being both aspheric.

The fifth lens element 250 with negative refractive power has a concave object-side surface 251 and a concave image-side surface 252. The fifth lens element 250 is made of plastic material, and has the object-side surface 251 and the image-side surface 252 being both aspheric.

The sixth lens element 260 with negative refractive power has a convex object-side surface 261 and a concave image-side surface 262 at a paraxial region thereof, wherein the image-side surface 262 of the sixth lens element 260 has a convex shape at an off-axis region thereof. The sixth lens element 260 is made of plastic material, and has the object-side surface 261 and the image-side surface 262 being both aspheric.

The IR-cut filter 280 is made of glass material and located between the sixth lens element 260 and the image plane 270, and will not affect the focal length of the imaging lens assembly.

The detailed optical data of the 2nd embodiment are shown in Table 3 and the aspheric surface data are shown in Table 4 below.

TABLE 3

2nd Embodiment
f = 4.65 mm, Fno = 1.85, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.437 | | | | |
| 2 | Lens 1 | 1.792 | ASP | 0.734 | Plastic | 1.544 | 55.9 | 3.70 |
| 3 | | 14.006 | ASP | 0.063 | | | | |

TABLE 3-continued

2nd Embodiment
f = 4.65 mm, Fno = 1.85, HFOV = 38.5 deg.

| Surface # | | Curvature Radius | | Thickness | Material | Index | Abbe # | Focal Length |
|---|---|---|---|---|---|---|---|---|
| 4 | Lens 2 | 14.220 | ASP | 0.240 | Plastic | 1.650 | 21.4 | −9.56 |
| 5 | | 4.293 | ASP | 0.196 | | | | |
| 6 | Stop | Plano | | 0.380 | | | | |
| 7 | Lens 3 | 10.936 | ASP | 0.278 | Plastic | 1.583 | 30.2 | 31.81 |
| 8 | | 26.376 | ASP | 0.355 | | | | |
| 9 | Lens 4 | −1.899 | ASP | 0.484 | Plastic | 1.544 | 55.9 | 8.49 |
| 10 | | −1.467 | ASP | 0.100 | | | | |
| 11 | Lens 5 | −22.423 | ASP | 0.361 | Plastic | 1.583 | 30.2 | −8.11 |
| 12 | | 6.037 | ASP | 0.100 | | | | |
| 13 | Lens 6 | 3.335 | ASP | 1.343 | Plastic | 1.535 | 55.7 | −25.20 |
| 14 | | 2.298 | ASP | 0.600 | | | | |
| 15 | IR-cut filter | Plano | | 0.145 | Glass | 1.517 | 64.2 | — |
| 16 | | Plano | | 0.360 | | | | |
| 17 | Image | Plane | | — | | | | |

Note: Reference wavelength is 587.6 nm (d-line).
Note: Half of the effective diameter of the stop at Surface 6 is 1.050 mm.

TABLE 4

Aspheric Coefficients

| Surface # | 2 | 3 | 4 | 5 | 7 | 8 |
|---|---|---|---|---|---|---|
| k = | 7.4883E−01 | 3.0133E+01 | −4.9139E+01 | −2.1140E+01 | −4.8575E+01 | −1.4380E+01 |
| A4 = | −7.6043E−03 | −1.1992E−01 | −1.6985E−01 | −2.3020E−02 | −1.0018E−01 | −7.8898E−02 |
| A6 = | −4.2764E−02 | 1.7665E−01 | 3.4129E−01 | 7.3561E−02 | −1.5041E−01 | −9.1974E−02 |
| A8 = | 8.2476E−02 | −1.5677E−01 | −3.6239E−01 | 8.1105E−02 | 3.8128E−01 | 2.2695E−01 |
| A10 = | −1.0835E−01 | 6.4553E−02 | 2.4043E−01 | −2.2190E−01 | −6.2876E−01 | −3.1258E−01 |
| A12 = | 6.5428E−02 | −1.0434E−02 | −8.3989E−02 | 1.8443E−01 | 4.7029E−01 | 2.1392E−01 |
| A14 = | −1.8843E−02 | −5.0582E−04 | 1.4120E−02 | −4.4335E−02 | −1.2454E−01 | −6.1652E−02 |
| A16 = | | | | | 2.0256E−03 | 5.4115E−03 |

| Surface # | 9 | 10 | 11 | 12 | 13 | 14 |
|---|---|---|---|---|---|---|
| k = | −1.2629E+00 | −1.3152E+00 | −4.7894E−08 | −1.5351E+01 | −4.7196E+01 | −1.1097E+01 |
| A4 = | −6.4678E−02 | −5.9894E−02 | 6.8754E−02 | −1.6286E−03 | −4.5073E−02 | −1.3584E−02 |
| A6 = | 1.0926E−01 | 1.1548E−01 | −8.8793E−02 | −3.2805E−02 | −1.5598E−02 | −5.8947E−03 |
| A8 = | −3.8361E−02 | −1.4913E−01 | 2.8387E−02 | 4.1752E−03 | 1.1917E−02 | 3.4060E−03 |
| A10 = | 5.4138E−03 | 1.3086E−01 | −3.0636E−03 | 3.3864E−03 | −2.5235E−03 | −7.7376E−04 |
| A12 = | −8.0860E−04 | −5.8138E−02 | −2.3290E−05 | −1.1517E−03 | 2.3896E−04 | 8.9620E−05 |
| A14 = | −5.2827E−05 | 1.1964E−02 | 1.5446E−05 | 1.3696E−04 | −9.2464E−06 | −5.2968E−06 |
| A16 = | | −8.7752E−04 | | −5.8368E−06 | 5.4335E−08 | 1.2661E−07 |

In the imaging lens assembly according to the 2nd embodiment, the definitions of the following parameters are the same as those stated in the 1st embodiment with corresponding values for the 2nd embodiment. Moreover, these parameters can be calculated from Table 3 and Table 4 as the following values and satisfy the following relationships:

| 2nd Embodiment | | | |
|---|---|---|---|
| f [mm] | 4.65 | T56/CT6 | 0.07 |
| Fno | 1.85 | (R3 + R4)/(R3 − R4) | 1.86 |
| HFOV [deg.] | 38.5 | R12/f | 0.49 |
| (V2 + V5)/V1 | 0.923 | Σ|f1/fx| | 1.54 |
| CT1/ET1 | 3.19 | (f/f5) + (f/f6) | −0.76 |
| SAG11/ET1 | 1.98 | TTL/f | 1.23 |
| T23/CT2 | 2.40 | | |

3rd Embodiment

Figure 5:
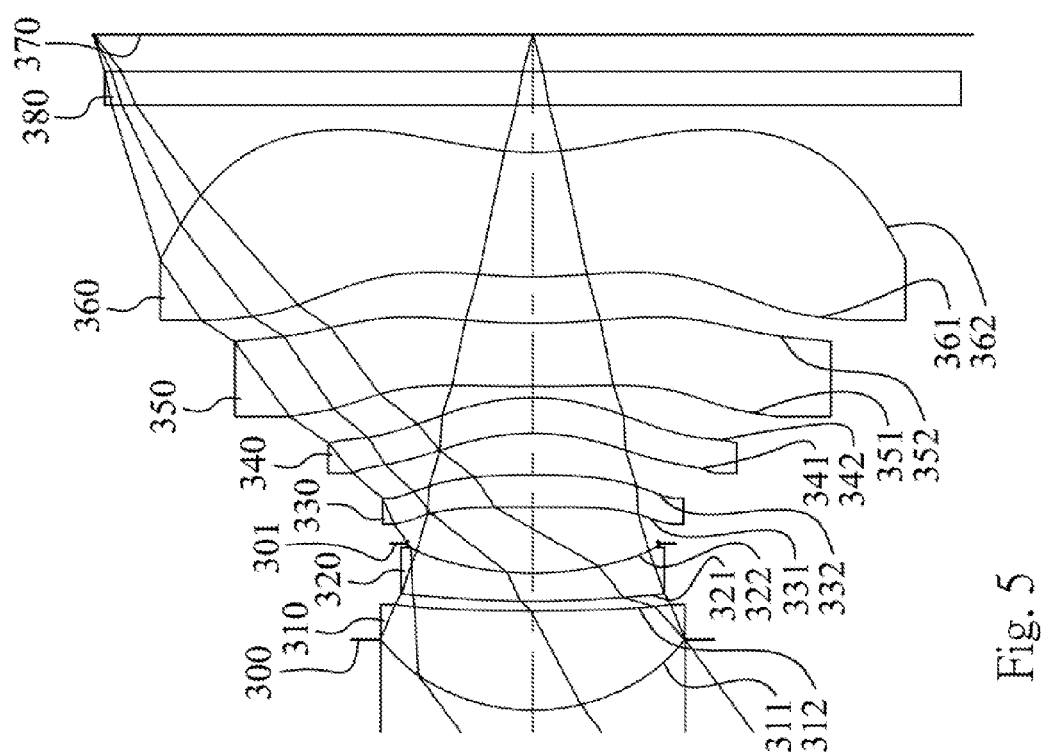
FIG. 5 is a schematic view of an imaging lens assembly according to the to 3rd embodiment of the present disclosure.
Figure 6:
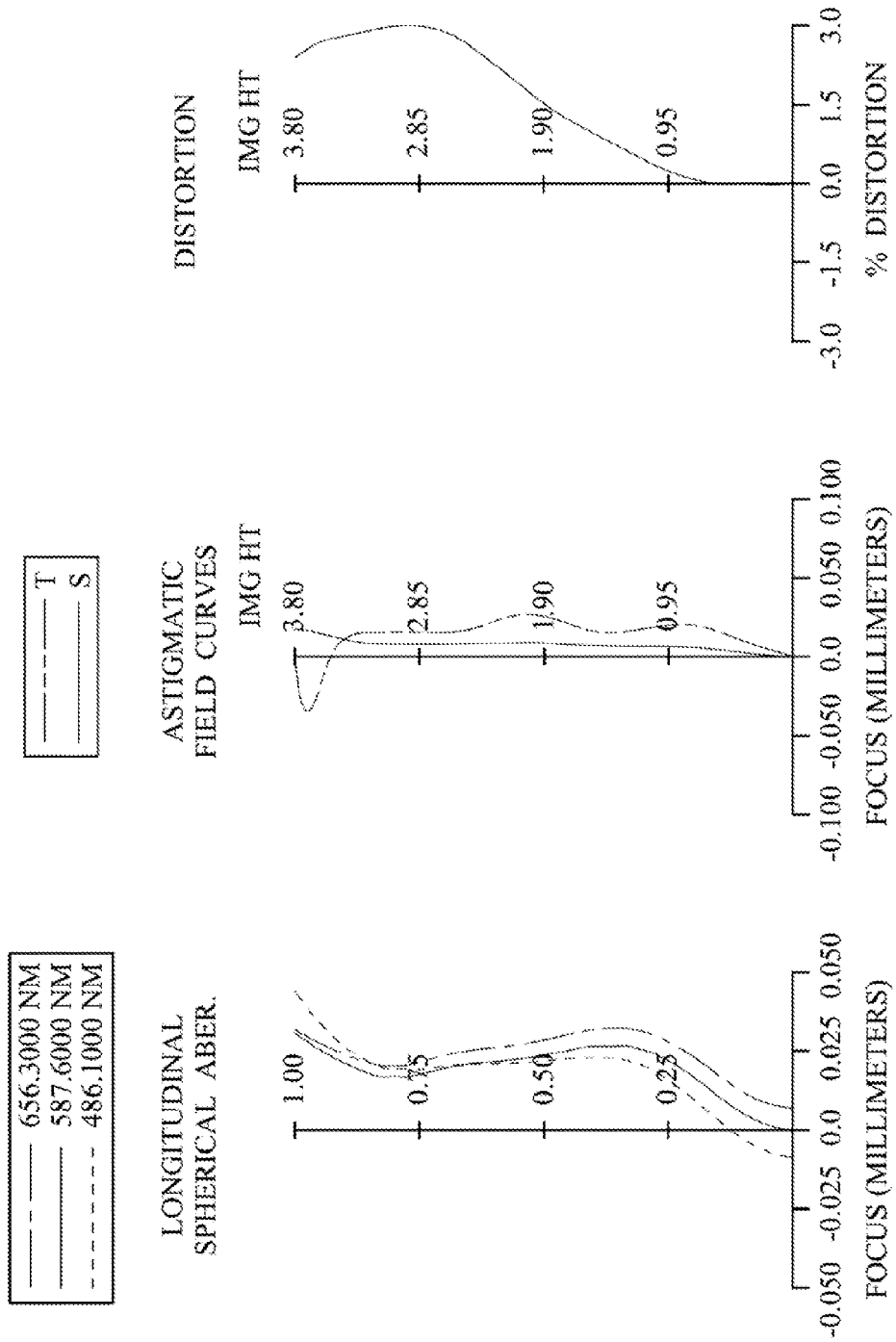
FIG. 6 shows spherical aberration curves, astigmatic field curves and a distortion curve of the imaging lens assembly according to the 3rd embodiment.

FIG. 5 is a schematic view of an imaging lens assembly according to the 3rd embodiment of the present disclosure. FIG. 6 shows spherical aberration curves, astigmatic field curves and a distortion curve of the imaging lens assembly according to the 3rd embodiment. In FIG. 5, the imaging lens assembly includes, in order from an object side to an image side, an aperture stop 300, a first lens element 310, a second lens element 320, a stop 301, a third lens element 330, a fourth lens element 340, a fifth lens element 350, a sixth lens element 360, an IR-cut filter 380 and an image plane 370, wherein the imaging lens assembly has a total of six non-cemented lens elements (310-360) with refractive power.

The first lens element 310 with positive refractive power has a convex object-side surface 311 and a concave image-side surface 312. The first lens element 310 is made of glass material, and has the object-side surface 311 and the image-side surface 312 being both aspheric.

The second lens element 320 with negative refractive power has a convex object-side surface 321 and a concave image-side surface 322. The second lens element 320 is made of plastic material, and has the object-side surface 321 and the image-side surface 322 being both aspheric.

The third lens element 330 with positive refractive power has a convex object-side surface 331 and a convex image-side surface 332. The third lens element 330 is made of plastic material, and has the object-side surface 331 and the image-side surface 332 being both aspheric, wherein both of the object-side surface 331 and the image-side surface 332 of the third lens element 330 have at least one inflection point.

The fourth lens element 340 with positive refractive power has a concave object-side surface 341 and a convex image-side surface 342. The fourth lens element 340 is made of plastic material, and has the object-side surface 341 and the image-side surface 342 being both aspheric.

The fifth lens element 350 with negative refractive power has a convex object-side surface 351 and a concave image-side surface 352. The fifth lens element 350 is made of plastic material, and has the object-side surface 351 and the image-side surface 352 being both aspheric.

The sixth lens element 360 with negative refractive power has a convex object-side surface 361 and a concave image-side surface 362 at a paraxial region thereof, wherein the image-side surface 362 of the sixth lens element 360 has a convex shape at an off-axis region thereof. The sixth lens element 360 is made of plastic material, and has the object-side surface 361 and the image-side surface 362 being both aspheric.

The IR-cut filter 380 is made of glass material and located between the sixth lens element 360 and the image plane 370, and will not affect the focal length of the imaging lens assembly.

The detailed optical data of the 3rd embodiment are shown in Table 5 and the aspheric surface data are shown in Table 6 below.

TABLE 5

3rd Embodiment
f = 5.00 mm, Fno = 1.90, HFOV = 35.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.609 | | | | |
| 2 | Lens 1 | 1.802 | ASP | 0.860 | Glass | 1.542 | 62.9 | 3.68 |
| 3 | | 15.624 | ASP | 0.080 | | | | |
| 4 | Lens 2 | 5.313 | ASP | 0.240 | Plastic | 1.639 | 23.5 | −7.52 |
| 5 | | 2.479 | ASP | 0.259 | | | | |
| 6 | Stop | Plano | | 0.317 | | | | |
| 7 | Lens 3 | 36.771 | ASP | 0.278 | Plastic | 1.568 | 40.0 | 16.01 |
| 8 | | −12.047 | ASP | 0.355 | | | | |
| 9 | Lens 4 | −2.415 | ASP | 0.313 | Plastic | 1.607 | 26.6 | 17.02 |
| 10 | | −2.053 | ASP | 0.100 | | | | |
| 11 | Lens 5 | 38.580 | ASP | 0.542 | Plastic | 1.639 | 23.5 | −10.93 |
| 12 | | 5.882 | ASP | 0.405 | | | | |
| 13 | Lens 6 | 4.000 | ASP | 1.078 | Plastic | 1.535 | 55.7 | −12.26 |
| 14 | | 2.251 | ASP | 0.400 | | | | |
| 15 | IR-cut filter | Plano | | 0.300 | Glass | 1.517 | 64.2 | — |
| 16 | | Plano | | 0.320 | | | | |
| 17 | Image | Plano | | — | | | | |

Note: Reference wavelength is 587.6 nm (d-line).
Note: Half of the effective diameter of the stop at Surface 6 is 1.080 mm.

TABLE 6

Aspheric Coefficients

| Surface # | 2 | 3 | 4 | 5 | 7 | 8 |
|---|---|---|---|---|---|---|
| k = | 4.7113E−01 | −3.8074E+01 | −4.0923E+01 | −8.1345E+00 | −4.9982E+01 | 4.9748E+01 |
| A4 = | −9.6004E−03 | −3.7182E−02 | −8.7431E−02 | −2.0909E−02 | −1.1850E−01 | −1.4133E−01 |
| A6 = | 1.0069E−02 | 7.3301E−02 | 1.3667E−01 | 9.2545E−02 | 8.3665E−02 | 1.3235E−01 |
| A8 = | −2.2147E−02 | −5.0926E−02 | −1.0732E−01 | −1.0434E−01 | −2.2913E−01 | −1.9495E−01 |
| A10 = | 2.0218E−02 | 7.3317E−03 | 3.3925E−02 | 1.0308E−01 | 3.5131E−01 | 2.2589E−01 |
| A12 = | −9.8413E−03 | 1.1485E−02 | 1.0758E−02 | −5.9424E−02 | −3.5457E−01 | −1.8289E−01 |
| A14 = | 1.8486E−03 | −4.5473E−03 | −7.7885E−03 | 1.8635E−02 | 2.1487E−01 | 9.2990E−02 |
| A16 = | | | | | −5.1736E−02 | −1.9142E−02 |

| Surface # | 9 | 10 | 11 | 12 | 13 | 14 |
|---|---|---|---|---|---|---|
| k = | −3.3697E−01 | −1.4075E+00 | −5.8774E−02 | −1.6790E+01 | −4.5896E+01 | −1.3242E+01 |
| A4 = | −1.4864E−01 | −6.7724E−02 | 4.4292E−01 | −1.0717E−02 | −6.0656E−02 | −2.1740E+00 |
| A6 = | 3.1528E−01 | 1.5311E−01 | −3.6655E+00 | −2.0848E−02 | 1.5834E−02 | −5.2600E+00 |
| A8 = | −2.4744E−01 | −1.2664E−01 | 1.2390E+00 | 6.9731E−03 | −5.6991E−03 | 3.3823E+01 |
| A10 = | 1.1476E−01 | 6.6980E−02 | −2.5957E+00 | −3.1593E−04 | 1.7728E−03 | −8.4391E+01 |
| A12 = | −2.9490E−02 | −2.0310E−02 | 1.7945E−01 | −1.5360E−04 | −2.8693E−04 | 1.0929E+02 |
| A14 = | 3.0679E−03 | 3.0861E−03 | 1.2324E−01 | 2.4430E−05 | 2.2292E−05 | −7.6446E+01 |
| A16 = | | −1.8130E−04 | | −1.1054E−06 | −6.6934E−07 | 2.3150E+01 |

In the imaging lens assembly according to the 3rd embodiment, the definitions of the following parameters are the same as those stated in the 1st embodiment with corresponding values for the 3rd embodiment. Moreover, these parameters can be calculated from Table 5 and Table 6 as the following values and satisfy the following relationships:

| 3rd Embodiment | | | |
|---|---|---|---|
| f [mm] | 5.00 | T56/CT6 | 0.38 |
| Fno | 1.90 | (R3 + R4)/(R3 − R4) | 2.75 |
| HFOV [deg.] | 36.5 | R12/f | 0.45 |
| (V2 + V5)/V1 | 0.747 | Σ|f1/fx| | 1.57 |
| CT1/ET1 | 2.88 | (f/f5) + (f/f6) | −0.87 |
| SAG11/ET1 | 2.06 | TTL/f | 1.17 |
| T23/CT2 | 2.40 | | |

4th Embodiment

Figure 7:
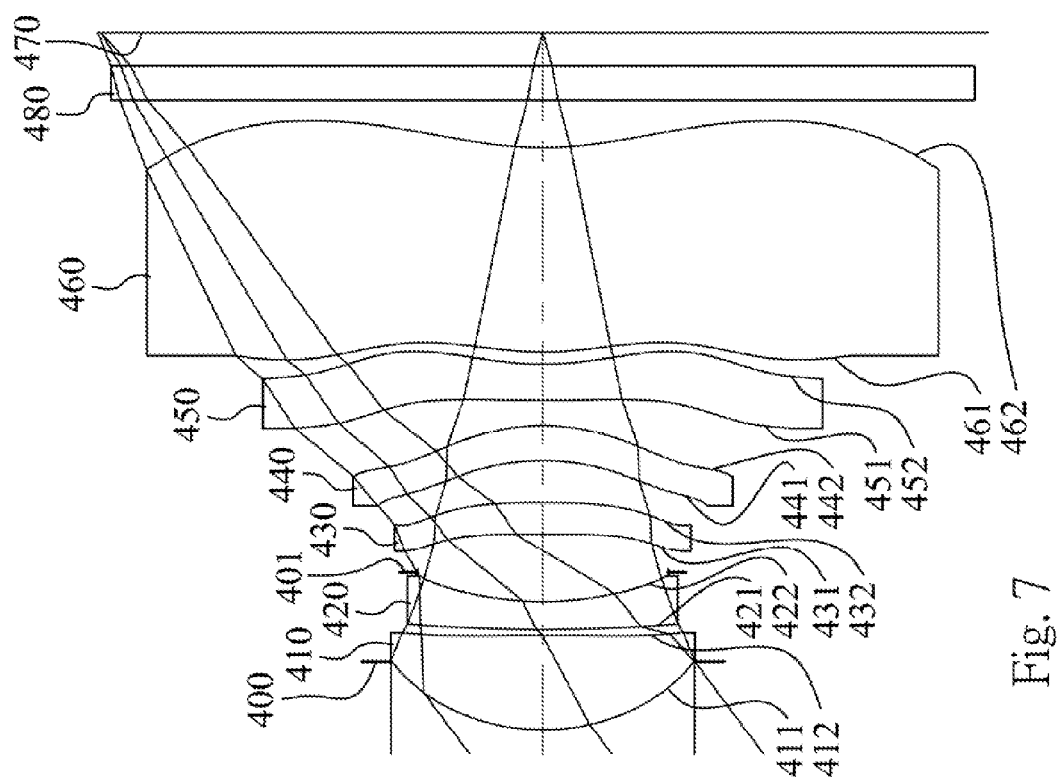
FIG. 7 is a schematic view of an imaging lens assembly according to the 4th embodiment of the present disclosure.
Figure 8:
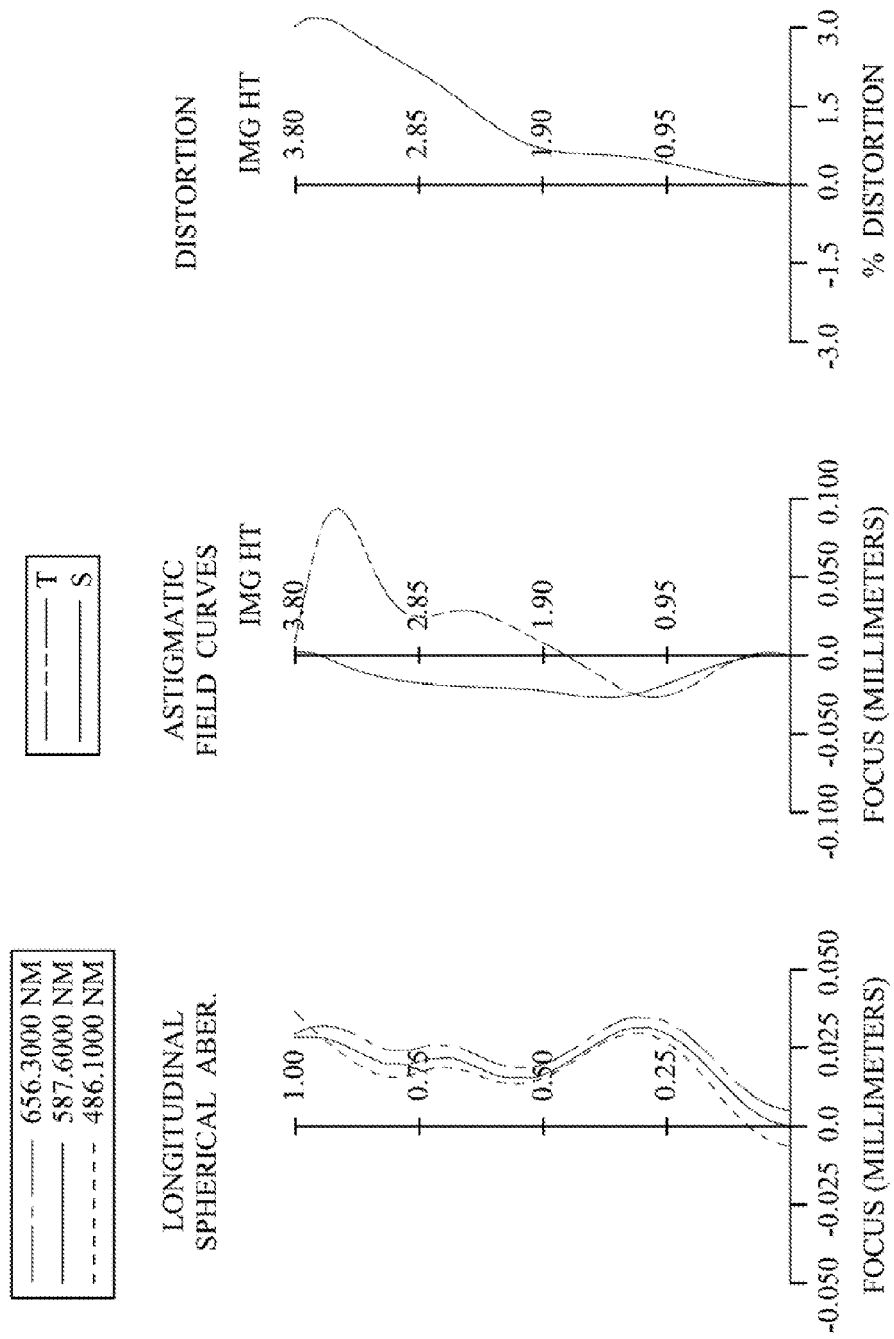
FIG. 8 shows spherical aberration curves, astigmatic field curves and a distortion curve of the imaging lens assembly according to the 4th embodiment.

FIG. 7 is a schematic view of an imaging lens assembly according to the 4th embodiment of the present disclosure. FIG. 8 shows spherical aberration curves, astigmatic field curves and a distortion curve of the imaging lens assembly according to the 4th embodiment. In FIG. 7, the imaging lens assembly includes, in order from an object side to an image side, an aperture to stop 400, a first lens element 410, a second lens element 420, a stop 401, a third lens element 430, a fourth lens element 440, a fifth lens element 450, a sixth lens element 460, an IR-cut filter 480 and an image plane 470, wherein the imaging lens assembly has a total of six non-cemented lens elements (410-460) with refractive power.

The first lens element 410 with positive refractive power has a convex object-side surface 411 and a concave image-side surface 412. The first lens element 410 is made of plastic material, and has the object-side surface 411 and the image-side surface 412 being both aspheric.

The second lens element 420 with negative refractive power has a convex object-side surface 421 and a concave image-side surface 422. The second lens element 420 is made of plastic material, and has the object-side surface 421 and the image-side surface 422 being both aspheric.

The third lens element 430 with positive refractive power has a convex object-side surface 431 and a convex image-side surface 432. The third lens element 430 is made of plastic material, and has the object-side surface 431 and the image-side surface 432 being both aspheric, wherein both of the object-side surface 431 and the image-side surface 432 of the third lens element 430 have at least one inflection point.

The fourth lens element 440 with positive refractive power has a concave object-side surface 441 and a convex image-side surface 442. The fourth lens element 440 is made of plastic material, and has the object-side surface 441 and the image-side surface 442 being both aspheric.

The fifth lens element 450 with negative refractive power has a convex object-side surface 451 and a concave image-side surface 452. The fifth lens element 450 is made of plastic material, and has the object-side surface 451 and the image-side surface 452 being both aspheric.

The sixth lens element 460 with positive refractive power has a convex object-side surface 461 and a concave image-side surface 462 at a paraxial region thereof, wherein the image-side surface 462 of the sixth lens element 460 has a convex shape at an off-axis region thereof. The sixth lens element 460 is made of plastic material, and has the object-side surface 461 and the image-side surface 462 being both aspheric.

The IR-cut filter 480 is made of glass material and located between the sixth lens element 460 and the image plane 470, and will not affect the focal length of the imaging lens assembly.

The detailed optical data of the 4th embodiment are shown in Table 7 and the aspheric surface data are shown in Table 8 below.

TABLE 7

4th Embodiment
f = 4.96 mm, Fno = 1.90, HFOV = 36.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.590 | | | | |
| 2 | Lens 1 | 1.831 | ASP | 0.814 | Plastic | 1.544 | 55.9 | 3.39 |
| 3 | | 208.630 | ASP | 0.050 | | | | |
| 4 | Lens 2 | 6.733 | ASP | 0.240 | Plastic | 1.639 | 23.5 | −6.32 |
| 5 | | 2.490 | ASP | 0.247 | | | | |
| 6 | Stop | Plano | | 0.329 | | | | |
| 7 | Lens 3 | 53.722 | ASP | 0.278 | Plastic | 1.535 | 55.7 | 16.73 |
| 8 | | −10.722 | ASP | 0.355 | | | | |
| 9 | Lens 4 | −2.184 | ASP | 0.305 | Plastic | 1.607 | 26.6 | 15.84 |
| 10 | | −1.874 | ASP | 0.221 | | | | |
| 11 | Lens 5 | 115.644 | ASP | 0.310 | Plastic | 1.580 | 32.8 | −4.86 |
| 12 | | 2.750 | ASP | 0.100 | | | | |
| 13 | Lens 6 | 2.661 | ASP | 1.765 | Plastic | 1.535 | 55.7 | 14.52 |
| 14 | | 3.112 | ASP | 0.400 | | | | |
| 15 | IR-cut filter | Plano | | 0.300 | Glass | 1.517 | 64.2 | — |
| 16 | | Plano | | 0.289 | | | | |
| 17 | Image | Plano | | — | | | | |

Note: Reference wavelength is 587.6 nm (d-line).
Note: Half of the effective diameter of the stop at Surface 6 is 1.080 mm.

TABLE 8

Aspheric Coefficients

| Surface # | 2 | 3 | 4 | 5 | 7 | 8 |
|---|---|---|---|---|---|---|
| k = | 5.2706E−01 | 3.0177E+01 | −4.9141E+01 | −8.5973E+00 | 5.0000E+01 | 4.7065E+01 |
| A4 = | −9.7137E−03 | −6.1831E−02 | −1.4517E−01 | −2.9085E−02 | −8.3688E−02 | −9.8790E−02 |
| A6 = | 9.6272E−03 | 1.5108E−01 | 2.7711E−01 | 4.7813E−02 | −1.6950E−01 | −7.1310E−02 |
| A8 = | −2.0681E−02 | −1.2723E−01 | −2.6558E−01 | 8.6916E−02 | 4.3172E−01 | 2.2595E−01 |
| A10 = | 1.9401E−02 | 3.2595E−02 | 1.2405E−01 | −2.0500E−01 | −6.2685E−01 | −3.0552E−01 |
| A12 = | −1.0007E−02 | 1.6879E−02 | −1.0729E−02 | 1.6671E−01 | 4.6095E−01 | 2.1673E−01 |
| A14 = | 2.0467E−03 | −8.4474E−03 | −7.2472E−03 | −4.4335E−02 | −1.2454E−01 | −6.0381E−02 |
| A16 = | | | | | 2.0256E−03 | 3.5524E−03 |

| Surface # | 9 | 10 | 11 | 12 | 13 | 14 |
|---|---|---|---|---|---|---|
| k = | −2.6749E−01 | −1.3152E+00 | −2.3477E−09 | −1.5351E+01 | −2.2891E+01 | −1.1097E+01 |
| A4 = | −8.3084E−02 | −5.8527E−02 | 5.5011E−01 | −8.1977E−04 | −3.6976E−02 | −5.5707E−03 |
| A6 = | 1.1528E−01 | 1.3031E−01 | −4.0084E+00 | −4.7260E−02 | −1.6839E−02 | −6.8044E−03 |
| A8 = | −3.0200E−02 | −1.5058E−01 | 5.8680E+00 | 1.9988E−02 | 1.1839E−02 | 2.8412E−03 |
| A10 = | 5.4138E−03 | 1.3008E−01 | −3.0930E+00 | −3.5517E−03 | −2.5192E−03 | −5.3159E−04 |
| A12 = | −6.9735E−04 | −5.8222E−02 | 3.2251E−01 | 3.2850E−04 | 2.4120E−04 | 5.2415E−05 |
| A14 = | −8.7786E−04 | 1.1984E−02 | 1.2328E−01 | −1.6330E−05 | −9.0768E−06 | −2.6528E−06 |
| A16 = | | −8.9946E−04 | | 3.4264E−07 | 1.9713E−08 | 5.4448E−08 |

In the imaging lens assembly according to the 4th embodiment, the definitions of the following parameters are the same as those stated in the 1st embodiment with corresponding values for the 4th embodiment. Moreover, these parameters can be calculated from Table 7 and Table 8 as the following values and satisfy the following relationships:

| 4th Embodiment | | | |
|---|---|---|---|
| f [mm] | 4.96 | T56/CT6 | 0.06 |
| Fno | 1.90 | (R3 + R4)/(R3 − R4) | 2.17 |
| HFOV [deg.] | 36.5 | R12/f | 0.63 |
| (V2 + V5)/V1 | 1.007 | Σ|f1/fx| | 1.88 |
| CT1/ET1 | 3.39 | (f/f5) + (f/f6) | −0.68 |
| SAG11/ET1 | 2.49 | TTL/f | 1.21 |
| T23/CT2 | 2.40 | | |

5th Embodiment

Figure 9:
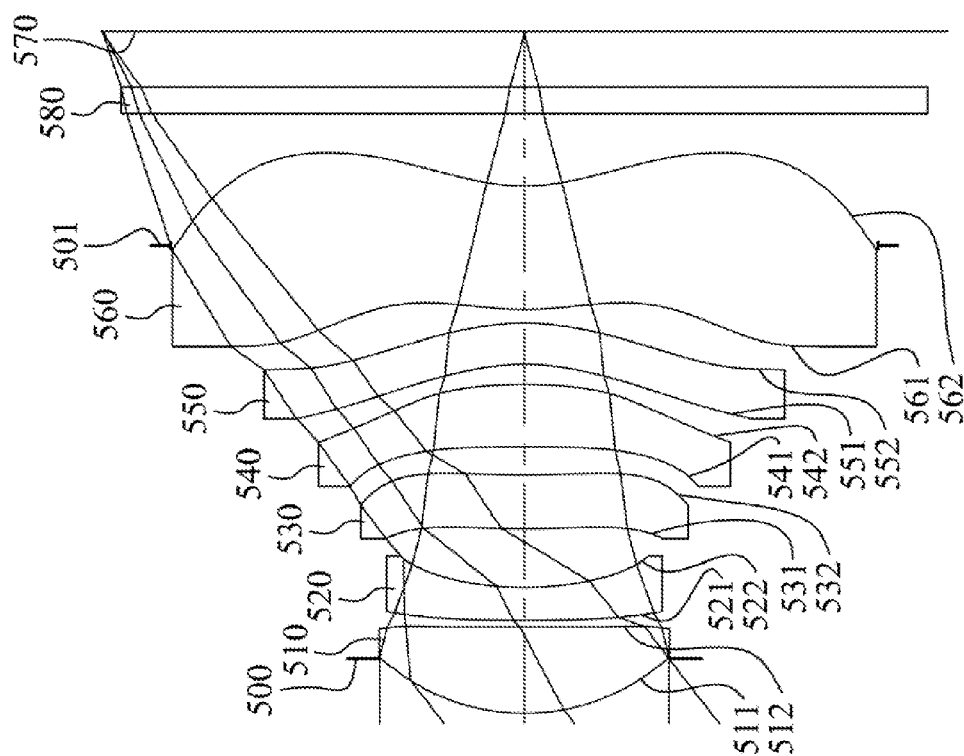
FIG. 9 is a schematic view of an imaging lens assembly according to the 5th embodiment of the present disclosure.
Figure 10:
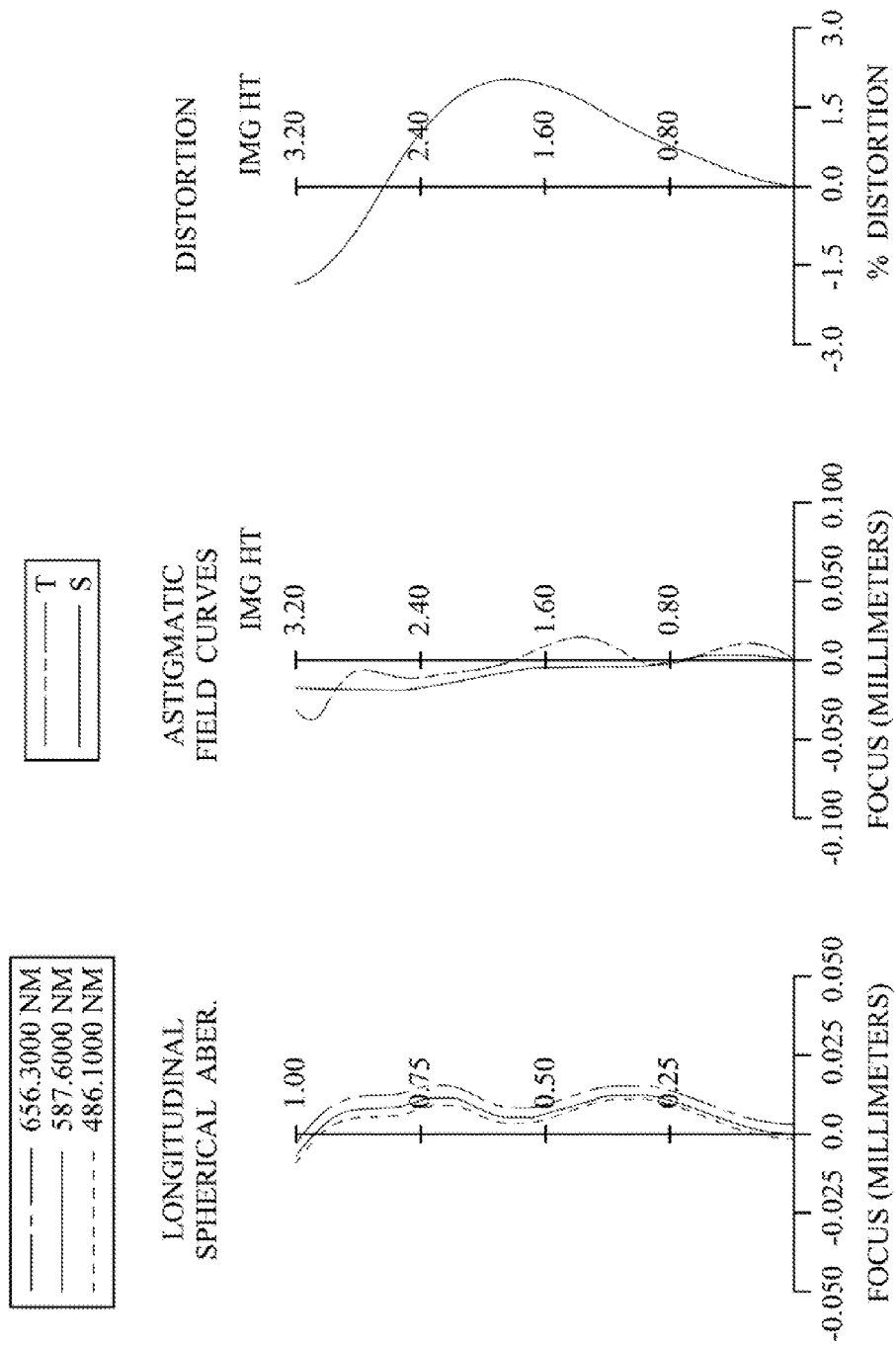
FIG. 10 shows spherical aberration curves, astigmatic field curves and a distortion curve of the imaging lens assembly according to the 5th embodiment.

FIG. 9 is a schematic view of an imaging lens assembly according to the 5th embodiment of the present disclosure. FIG. 10 shows spherical aberration curves, astigmatic field curves and a distortion curve of the imaging lens assembly according to the 5th embodiment. In FIG. 9, the imaging lens assembly includes, in order from an object side to an image side, an aperture stop 500, a first lens element 510, a second lens element 520, a third lens element 530, a fourth lens element 540, a fifth lens element 550, a sixth lens element 560, a stop 501, an IR-cut filter 580 and an image plane 570, wherein the imaging lens assembly has a total of six non-cemented lens elements (510-560) with refractive power.

The first lens element 510 with positive refractive power has a convex object-side surface 511 and a planar image-side surface 512. The first lens element 510 is made of plastic material, and has the object-side surface 511 and the image-side surface 512 being both aspheric.

The second lens element 520 with negative refractive power has a convex object-side surface 521 and a concave-image-side surface 522. The second lens element 520 is made of plastic material, and has the object-side surface 521 and the image-side surface 522 being both aspheric.

The third lens element 530 with negative refractive power has a convex object-side surface 531 and a concave image-side surface 532. The third lens element 530 is made of plastic material, and has the object-side surface 531 and the image-side surface 532 being both aspheric, wherein both of the object-side surface 531 and the image-side surface 532 of the third lens element 530 have at least one inflection point.

The fourth lens element 540 with positive refractive power has a concave object-side surface 541 and a convex image-side surface 542. The fourth lens element 540 is made of plastic material, and has the object-side surface 541 and the image-side surface 542 being both aspheric.

The fifth lens element 550 with negative refractive power has a concave object-side surface 551 and a convex image-side surface 552. The fifth lens element 550 is made of plastic material, and has the object-side surface 551 and the image-side surface 552 being both aspheric.

The sixth lens element 560 with negative refractive power has a convex object-side surface 561 and a concave image-side surface 562 at a paraxial region thereof, wherein the image-side surface 562 of the sixth lens element 560 has a convex shape at an off-axis region thereof. The sixth lens element 560 is made of plastic material, and has the object-side surface 561 and the image-side surface 562 being both aspheric.

The IR-cut filter 580 is made of glass material and located between the sixth lens element 560 and the image plane 570, and will not affect the focal length of the imaging lens assembly.

The detailed optical data of the 5th embodiment are shown in Table 9 and the aspheric surface data are shown in Table 10 below.

TABLE 9

5th Embodiment
f = 4.24 mm, Fno = 1.93, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.419 | | | | |
| 2 | Lens 1 | 1.601 | ASP | 0.661 | Plastic | 1.544 | 55.9 | 2.94 |
| 3 | | ∞ | ASP | 0.049 | | | | |
| 4 | Lens 2 | 10.305 | ASP | 0.251 | Plastic | 1.633 | 23.4 | −5.00 |
| 5 | | 2.399 | ASP | 0.444 | | | | |
| 6 | Lens 3 | 7.935 | ASP | 0.412 | Plastic | 1.544 | 55.9 | −424.68 |
| 7 | | 7.531 | ASP | 0.209 | | | | |
| 8 | Lens 4 | −52.184 | ASP | 0.480 | Plastic | 1.544 | 55.9 | 7.41 |
| 9 | | −3.755 | ASP | 0.154 | | | | |
| 10 | Lens 5 | −1.497 | ASP | 0.310 | Plastic | 1.607 | 26.6 | −28.69 |
| 11 | | −1.765 | ASP | 0.102 | | | | |
| 12 | Lens 6 | 2.331 | ASP | 0.942 | Plastic | 1.535 | 55.7 | −11.48 |
| 13 | | 1.452 | ASP | −0.450 | | | | |
| 14 | Stop | Plano | | 1.000 | | | | |
| 15 | IR-cut filter | Plano | | 0.200 | Glass | 1.517 | 64.2 | — |
| 16 | | Plano | | 0.429 | | | | |
| 17 | Image | Plano | | — | | | | |

Note: Reference wavelength is 587.6 nm (d-line).
Note: Half of the effective diameter of the stop at Surface 14 is 2.700 mm.

TABLE 10

Aspheric Coefficients

| Surface # | 2 | 3 | 4 | 5 | 6 | 7 |
|---|---|---|---|---|---|---|
| k = | 2.0448E−01 | −1.0000E+00 | −1.9988E+01 | −3.0532E+00 | −5.1754E+00 | −1.9997E+01 |
| A4 = | −5.3811E−03 | −3.9282E−03 | −4.5133E−02 | −6.8752E−03 | −9.9436E−02 | −8.9436E−02 |
| A6 = | 2.5985E−03 | 4.4613E−02 | 1.6772E−01 | 1.5114E−01 | 4.8321E−02 | 4.5007E−02 |
| A8 = | 1.4283E−02 | −7.0850E−02 | −2.5736E−01 | −1.5340E−01 | −1.6856E−01 | −1.4186E−01 |
| A10 = | −7.1374E−02 | 8.4187E−02 | 3.1392E−01 | 1.3794E−01 | 2.2959E−01 | 1.5361E−01 |
| A12 = | 8.5860E−02 | −7.5173E−02 | −2.4184E−01 | −6.8831E−02 | −1.8405E−01 | −9.7905E−02 |
| A14 = | −3.7118E−02 | 2.0950E−02 | 7.7222E−02 | 3.3758E−02 | 5.9754E−02 | 2.4715E−02 |

| Surface # | 8 | 9 | 10 | 11 | 12 | 13 |
|---|---|---|---|---|---|---|
| k = | 3.0000E+00 | −7.0095E+00 | −3.0881E+00 | −2.1962E+00 | −1.9957E+01 | −6.0159E+00 |
| A4 = | −7.8556E−02 | −4.6066E−02 | 3.6936E−01 | 1.7952E−01 | −1.2967E−01 | −5.8438E−02 |
| A6 = | −3.0684E−02 | −1.7825E−01 | −7.8809E−01 | −2.2234E−01 | 1.5920E−02 | 1.4974E−02 |
| A8 = | 1.0303E−01 | 1.5476E−01 | 8.6439E−01 | 1.6494E−01 | 7.5505E−03 | −2.7991E−03 |
| A10 = | −1.6582E−01 | 4.4261E−02 | −5.2278E−01 | −7.0463E−02 | −1.6489E−03 | 1.4802E−04 |
| A12 = | 1.5759E−01 | −9.0881E−02 | 1.7641E−01 | 1.7593E−02 | −8.9249E−05 | 3.7095E−05 |
| A14 = | −7.9372E−02 | 3.5397E−02 | −3.1035E−02 | −2.3872E−03 | 4.6481E−05 | −7.7588E−06 |
| A16 = | 1.5336E−02 | −4.5167E−03 | 2.2105E−03 | 1.3513E−04 | −3.1562E−06 | 4.5383E−07 |

In the imaging lens assembly according to the 5th embodiment, the definitions of the following parameters are the same as those stated in the 1st embodiment with corresponding values for the 5th embodiment. Moreover, these parameters can be calculated from Table 9 and Table 10 as the following values and satisfy the following relationships:

| 5th Embodiment | | | |
|---|---|---|---|
| f [mm] | 4.24 | T56/CT6 | 0.11 |
| Fno | 1.93 | (R3 + R4)/(R3 − R4) | 1.61 |
| HFOV [deg.] | 37.5 | R12/f | 0.34 |
| (V2 + V5)/V1 | 0.894 | Σ|f1/fx| | 1.35 |
| CT1/ET1 | 3.01 | (f/f5) + (f/f6) | −0.52 |
| SAG11/ET1 | 1.95 | TTL/f | 1.22 |
| T23/CT2 | 1.77 | | |

6th Embodiment

Figure 11:
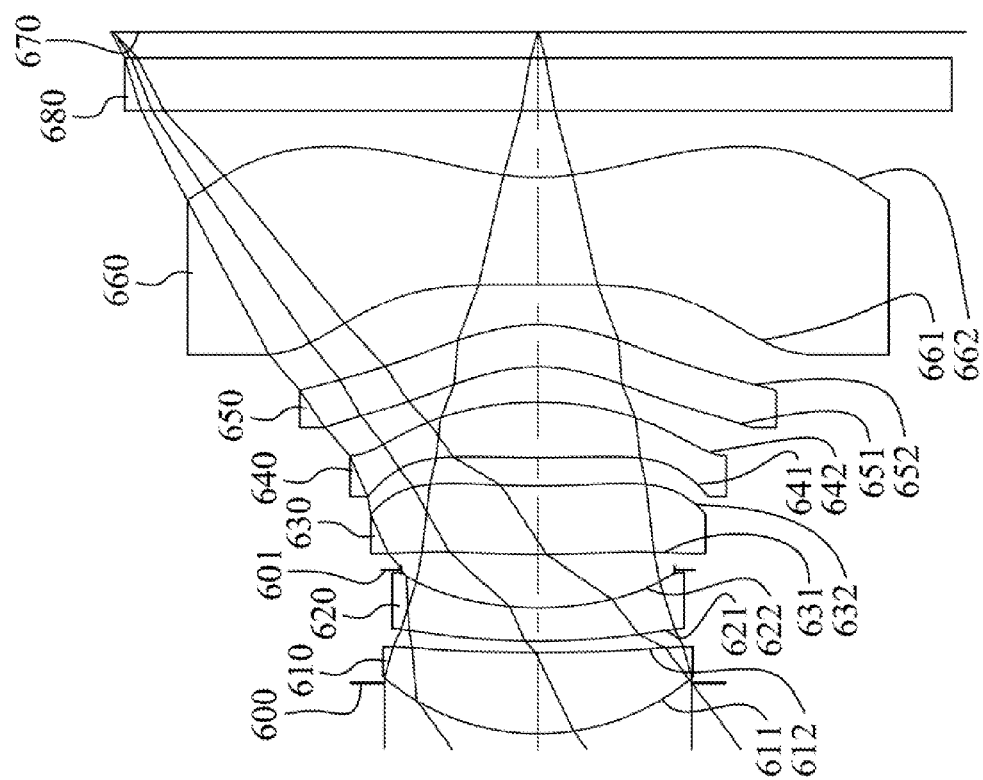
FIG. 11 is a schematic view of an imaging lens assembly according to the 6th embodiment of the present disclosure.
Figure 12:
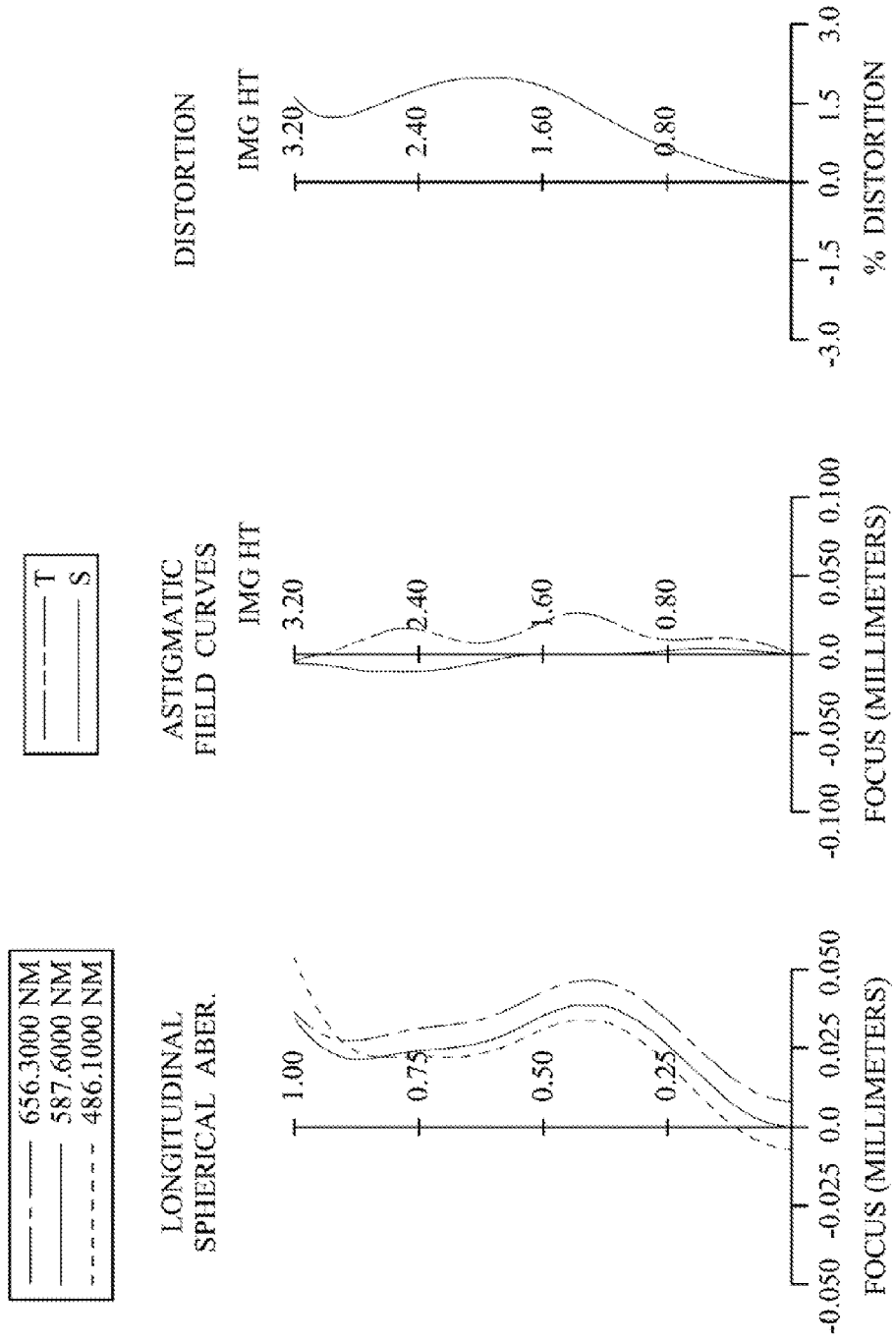
FIG. 12 shows spherical aberration curves, astigmatic field curves and a distortion curve of the imaging lens assembly according to the 6th embodiment.

FIG. 11 is a schematic view of an imaging lens assembly according to the 6th embodiment of the present disclosure. FIG. 12 shows spherical aberration curves, astigmatic field curves and a distortion curve of the imaging lens assembly according to the 6th embodiment. In FIG. 11, the imaging lens assembly includes, in order from an object side to an image side, an aperture stop 600, a first lens element 610, a second lens element 620, a stop 601, a third lens element 630, a fourth lens element 640, a fifth lens element 650, a sixth lens element 660, an IR-cut filter 680 and an image plane 670, wherein the imaging lens assembly has a total of six non-cemented lens elements (610-660) with refractive power.

The first lens element 610 with positive refractive power has a convex object-side surface 611 and a concave image-side surface 612. The first lens element 610 is made of plastic material, and has the object-side surface 611 and the image-side surface 612 being both aspheric.

The second lens element 620 with negative refractive power has a convex object-side surface 621 and a concave image-side surface 622. The second lens element 620 is made of plastic material, and has the object-side surface 621 and the image-side surface 622 being both aspheric.

The third lens element 630 with negative refractive power has a convex object-side surface 631 and a concave image-side surface 632. The third lens element 630 is made of plastic material, and has the object-side surface 631 and the image-side surface 632 being both aspheric, wherein both of the object-side surface 631 and the image-side surface 632 of the third lens element 630 have at least one inflection point.

The fourth lens element 640 with positive refractive power has a convex object-side surface 641 and a convex image-side surface 642. The fourth lens element 640 is made of plastic material, and has the object-side surface 641 and the image-side surface 642 being both aspheric.

The fifth lens element 650 with positive refractive power has a concave object-side surface 651 and a convex image-side surface 652. The fifth lens element 650 is made of plastic material, and has the object-side surface 651 and the image-side surface 652 being both aspheric.

The sixth lens element 660 with negative refractive power has a concave object-side surface 661 and a concave image-side surface 662 at a paraxial region thereof, wherein the image-side surface 662 of the sixth lens element 660 has a convex shape at an off-axis region thereof. The sixth lens element 660 is made of plastic material, and has the object-side surface 661 and the image-side surface 662 being both aspheric.

The IR-cut filter 680 is made of glass material and located between the sixth lens element 660 and the image plane 670, and will not affect the focal length of the imaging lens assembly.

The detailed optical data of the 6th embodiment are shown in Table 11 and the aspheric surface data are shown in Table 12 below.

TABLE 11

6th Embodiment
f = 4.28 mm, Fno = 1.85, HFOV = 36.2 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.387 |  |  |  |  |
| 2 | Lens 1 | 1.808 | ASP | 0.616 | Plastic | 1.575 | 56.0 | 3.54 |
| 3 |  | 14.193 | ASP | 0.087 |  |  |  |  |
| 4 | Lens 2 | 5.431 | ASP | 0.250 | Plastic | 1.650 | 21.4 | −6.59 |
| 5 |  | 2.350 | ASP | 0.286 |  |  |  |  |
| 6 | Stop | Plano |  | 0.112 |  |  |  |  |
| 7 | Lens 3 | 7.226 | ASP | 0.522 | Plastic | 1.514 | 56.8 | −124.04 |
| 8 |  | 6.331 | ASP | 0.212 |  |  |  |  |
| 9 | Lens 4 | 11.275 | ASP | 0.419 | Plastic | 1.514 | 56.8 | 4.01 |
| 10 |  | −2.491 | ASP | 0.267 |  |  |  |  |
| 11 | Lens 5 | −1.235 | ASP | 0.314 | Plastic | 1.607 | 26.6 | 24.73 |
| 12 |  | −1.251 | ASP | 0.304 |  |  |  |  |
| 13 | Lens 6 | −182.402 | ASP | 0.810 | Plastic | 1.514 | 56.8 | −3.36 |
| 14 |  | 1.744 | ASP | 0.500 |  |  |  |  |
| 15 | IR-cut filter | Plano |  | 0.400 | Glass | 1.517 | 64.2 | — |
| 16 |  | Plano |  | 0.198 |  |  |  |  |
| 17 | Image | Plano |  | — |  |  |  |  |

Note: Reference wavelength is 587.6 nm (d-line).
Note: Half of the effective diameter of the stop at Surface 6 is 1.030 mm.

TABLE 12

Aspheric Coefficients

| Surface # | 2 | 3 | 4 | 5 | 7 | 8 |
|---|---|---|---|---|---|---|
| k = | 1.9926E−01 | −2.0000E+01 | −1.9091E+01 | −3.3092E+00 | −2.0000E+01 | −2.0000E+01 |
| A4 = | −4.6396E−03 | −2.9884E−03 | −3.3693E−02 | −2.4645E−03 | −7.0822E−02 | −7.6205E−02 |
| A6 = | 2.6472E−03 | 2.3331E−02 | 1.1416E−01 | 9.3260E−02 | 4.8972E−02 | 1.8592E−02 |
| A8 = | 9.1993E−03 | −2.3286E−02 | −1.4260E−01 | −6.9721E−02 | −8.3102E−02 | −7.6594E−02 |
| A10 = | −2.9084E−02 | 2.8664E−02 | 1.2778E−01 | 4.4630E−02 | 9.3754E−02 | 6.1262E−02 |
| A12 = | 3.0094E−02 | −2.6347E−02 | −8.4755E−02 | −2.4152E−02 | −5.7890E−02 | −3.5961E−02 |
| A14 = | −1.0752E−02 | 6.0684E−03 | 2.2368E−02 | 9.7784E−03 | 1.7309E−02 | 9.3779E−03 |

| Surface # | 9 | 10 | 11 | 12 | 13 | 14 |
|---|---|---|---|---|---|---|
| k = | −1.0000E+00 | −9.8146E+00 | −2.6277E+00 | −2.9329E+00 | −1.9957E+01 | −7.7137E+00 |
| A4 = | −7.9180E−02 | −1.0631E−01 | 1.7293E−01 | 1.8499E−01 | −1.0798E+00 | −3.7349E−02 |
| A6 = | 1.9293E−02 | 1.0244E−02 | −3.4874E−01 | −2.9662E−01 | −1.4989E+01 | 3.4803E−03 |
| A8 = | −5.0852E−02 | 4.9771E−02 | 4.4955E−01 | 2.9764E−01 | 7.3906E+01 | 1.2149E−03 |
| A10 = | −1.5348E−02 | −5.7074E−02 | −2.9287E−01 | −1.6812E−01 | −1.7184E+02 | −6.7830E−04 |
| A12 = | 2.6811E−02 | 3.2617E−02 | 9.5546E−02 | 5.2504E−02 | 2.3181E+02 | 1.3949E−04 |
| A14 = | −9.8034E−03 | −8.3596E−03 | −1.4201E−02 | −8.4257E−03 | −1.6812E+02 | −1.4353E−05 |
| A16 = | 2.0186E−03 | 8.6537E−04 | 6.4883E−04 | 5.3674E−04 | 4.9939E+01 | 6.1705E−07 |

In the imaging lens assembly according to the 6th embodiment, the definitions of the following parameters are the same as those stated in the 1st embodiment with corresponding values for the 6th embodiment. Moreover, these parameters can be calculated from Table 11 and Table 12 as the following values and satisfy the following relationships:

| 6th Embodiment | | | |
|---|---|---|---|
| f [mm] | 4.28 | T56/CT6 | 0.38 |
| Fno | 1.85 | (R3 + R4)/(R3 − R4) | 2.53 |
| HFOV [deg.] | 36.2 | R12/f | 0.41 |
| (V2 + V5)/V1 | 0.857 | Σ|f1/fx| | 2.64 |
| CT1/ET1 | 2.74 | (f/f5) + (f/f6) | −1.10 |
| SAG11/ET1 | 1.99 | TTL/f | 1.24 |
| T23/CT2 | 1.59 | | |

7th Embodiment

Figure 13:
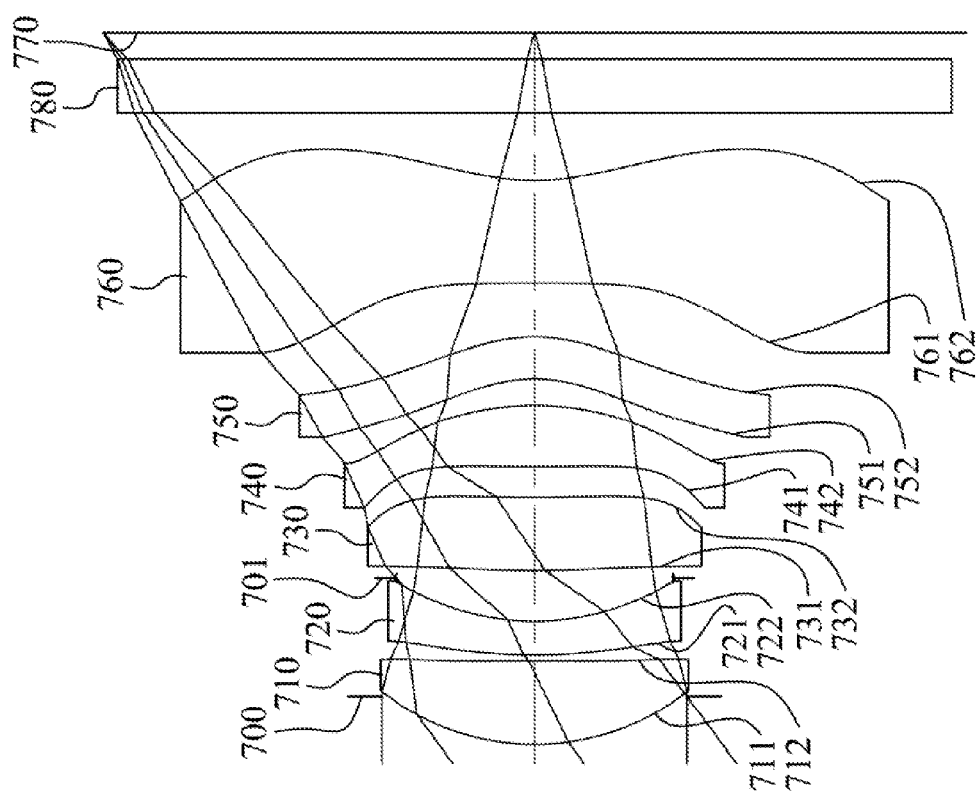
FIG. 13 is a schematic view of an imaging lens assembly according to the 7th embodiment of the present disclosure.
Figure 14:
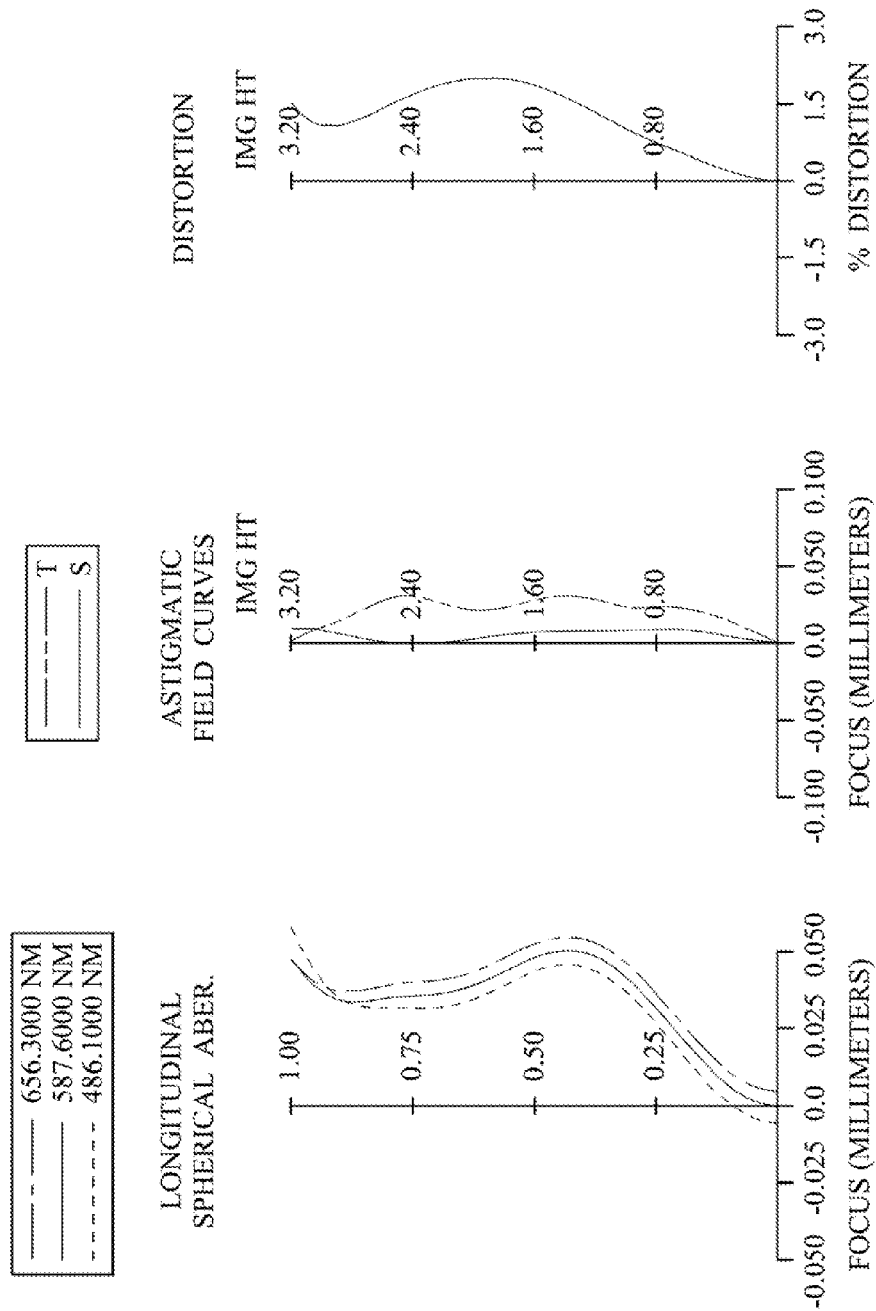
FIG. 14 shows spherical aberration curves, astigmatic field curves and a distortion curve of the imaging lens assembly according to the 7th embodiment.

FIG. 13 is a schematic view of an imaging lens assembly according to the 7th embodiment of the present disclosure. FIG. 14 shows spherical aberration curves, astigmatic field curves and a distortion curve of the imaging lens assembly according to the 7th embodiment. In FIG. 13, the imaging lens assembly includes, in order from an object side to an image side, an aperture stop 700, a first lens element 710, a second lens element 720, a stop 701, a third lens element 730, a fourth lens element 740, a fifth lens element 750, a sixth lens element 760, an IR-cut filter 780 and an image plane 770, wherein the imaging lens assembly has a total of six non-cemented lens elements (710-760) with refractive power.

The first lens element 710 with positive refractive power has a convex object-side surface 711 and a convex image-side surface 712. The first lens element 710 is made of plastic material, and has the object-side surface 711 and the image-side surface 712 being both aspheric.

The second lens element 720 with negative refractive power has a convex object-side surface 721 and a concave image-side surface 722. The second lens element 720 is made of plastic material, and has the object-side surface 721 and the image-side surface 722 being both aspheric.

The third lens element 730 with positive refractive power has a convex object-side surface 731 and a concave image-side surface 732. The third lens element 730 is made of plastic material, and has the object-side surface 731 and the image-side surface 732 being both aspheric, wherein both of the object-side surface 731 and the image-side surface 732 of the third lens element 730 have at least one inflection point.

The fourth lens element 740 with positive refractive power has a convex object-side surface 741 and a convex image-side surface 742. The fourth lens element 740 is made of plastic material, and has the object-side surface 741 and the image-side surface 742 being both aspheric.

The fifth lens element 750 with positive refractive power has a concave object-side surface 751 and a convex image-side surface 752. The fifth lens element 750 is made of plastic material, and has the object-side surface 751 and the image-side surface 752 being both aspheric.

The sixth lens element 760 with negative refractive power has a concave object-side surface 761 and a concave image-side surface 762 at a paraxial region thereof, wherein the image-side surface 762 of the sixth lens element 760 has a convex shape at an off-axis region thereof. The sixth lens element 760 is made of plastic material, and has the object-side surface 761 and the image-side surface 762 being both aspheric.

The IR-cut filter 780 is made of glass material and located between the sixth lens element 760 and the image plane 770, and will not affect the focal length of the imaging lens assembly.

The detailed optical data of the 7th embodiment are shown in Table 13 and the aspheric surface data are shown in Table 14 below.

TABLE 13

7th Embodiment
f = 4.24 mm, Fno = 1.87, HFOV = 36.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.359 | | | | |
| 2 | Lens 1 | 1.839 | ASP | 0.626 | Plastic | 1.544 | 55.9 | 3.32 |
| 3 | | −95.809 | ASP | 0.043 | | | | |
| 4 | Lens 2 | 3.701 | ASP | 0.250 | Plastic | 1.639 | 23.5 | −5.33 |
| 5 | | 1.727 | ASP | 0.320 | | | | |
| 6 | Stop | Plano | | 0.054 | | | | |
| 7 | Lens 3 | 7.290 | ASP | 0.547 | Plastic | 1.514 | 56.8 | 50.68 |
| 8 | | 9.868 | ASP | 0.229 | | | | |
| 9 | Lens 4 | 14.286 | ASP | 0.454 | Plastic | 1.514 | 56.8 | 3.61 |
| 10 | | −2.107 | ASP | 0.198 | | | | |
| 11 | Lens 5 | −1.083 | ASP | 0.310 | Plastic | 1.607 | 26.6 | 412.11 |
| 12 | | −1.195 | ASP | 0.403 | | | | |
| 13 | Lens 6 | −80.092 | ASP | 0.764 | Plastic | 1.514 | 56.8 | −3.34 |
| 14 | | 1.760 | ASP | 0.500 | | | | |
| 15 | IR-cut filter | Plano | | 0.400 | Glass | 1.517 | 64.2 | — |
| 16 | | Plano | | 0.199 | | | | |
| 17 | Image | Plano | | — | | | | |

Note: Reference wavelength is 587.6 nm (d-line).
Note: Half of the effective diameter of the stop at Surface 6 is 1.030 mm.

TABLE 14

Aspheric Coefficients

| Surface # | 2 | 3 | 4 | 5 | 7 | 8 |
|---|---|---|---|---|---|---|
| k = | 1.8799E−01 | −2.0000E+01 | −2.0000E+01 | −4.0105E+00 | 3.0000E+00 | 2.2404E+00 |
| A4 = | −2.8242E−03 | 1.3670E−02 | −4.3971E−02 | −1.0490E−02 | −5.9274E−02 | −7.7310E−02 |
| A6 = | 4.1224E−04 | 1.7946E−02 | 1.1583E−01 | 9.0113E−02 | 4.7863E−02 | 2.0660E−02 |
| A8 = | 1.1514E−02 | −2.6215E−02 | −1.4482E−01 | −6.0696E−02 | −8.4196E−02 | −7.8424E−02 |
| A10 = | −2.9908E−02 | 3.0295E−02 | 1.2699E−01 | 3.6166E−02 | 9.3969E−02 | 6.0698E−02 |
| A12 = | 3.0094E−02 | −2.6347E−02 | −8.4755E−02 | −2.4152E−02 | −5.7412E−02 | −3.5529E−02 |
| A14 = | −1.0752E−02 | 6.0684E−03 | 2.2368E−02 | 9.7784E−03 | 1.7309E−02 | 9.4313E−03 |

| Surface # | 9 | 10 | 11 | 12 | 13 | 14 |
|---|---|---|---|---|---|---|
| k = | −1.0000E+00 | −1.0742E+01 | −2.9847E+00 | −3.1696E+00 | −1.9957E+01 | −7.7137E+00 |
| A4 = | −8.3807E−02 | −1.0834E−01 | 1.7139E−01 | 1.5589E−01 | −5.9669E−02 | −3.7079E−02 |
| A6 = | 1.3490E−02 | 9.7574E−03 | −2.9660E−01 | −1.9761E−01 | −5.1318E−02 | 3.4803E−03 |
| A8 = | −5.0140E−02 | 4.9744E−02 | 3.5841E−01 | 1.7837E−01 | 4.9305E−02 | 1.2149E−03 |
| A10 = | −1.4518E−02 | −5.7095E−02 | −2.2397E−01 | −9.7560E−02 | −1.9383E−02 | −6.7830E−04 |
| A12 = | 2.7016E−02 | 3.2623E−02 | 6.7967E−02 | 3.0814E−02 | 4.5306E−03 | 1.3949E−04 |
| A14 = | −9.7931E−03 | −8.3539E−03 | −8.2808E−03 | −5.1144E−03 | −5.9342E−04 | −1.4353E−05 |
| A16 = | 2.0186E−03 | 8.7125E−04 | 1.0352E−04 | 3.3998E−04 | 3.2672E−05 | 6.1705E−07 |

In the imaging lens assembly according to the 7th embodiment, the definitions of the following parameters are the same as those stated in the 1st embodiment with corresponding values for the 7th embodiment. Moreover, these parameters can be calculated from Table 13 and Table 14 as the following values and satisfy the following relationships:

| 7th Embodiment | | | |
|---|---|---|---|
| f [mm] | 4.24 | T56/CT6 | 0.53 |
| Fno | 1.87 | (R3 + R4)/(R3 − R4) | 2.75 |
| HFOV [deg.] | 36.4 | R12/f | 0.42 |
| (V2 + V5)/V1 | 0.896 | Σ|f1/fx| | 2.59 |
| CT1/ET1 | 2.77 | (f/f5) + (f/f6) | −1.26 |
| SAG11/ET1 | 1.80 | TTL/f | 1.25 |
| T23/CT2 | 1.50 | | |

It is to be noted that TABLES 1-14 show different data of the different embodiments; however, the data of the different embodiments are obtained from experiments. Therefore, any optical system of the same structure is considered to be less than or equal to the scope of the present disclosure even if it uses different data. The embodiments depicted above and the appended drawings are exemplary and are not intended to limit the scope of the present disclosure.

What is claimed is:

1. An imaging lens assembly comprising, in order from an object side to an image side:

a first lens element with positive refractive power having a convex object-side surface;

a second lens element with negative refractive power having a concave image-side surface;

a third lens element having refractive power;

a fourth lens element having refractive power;

a fifth lens element having refractive power; and a sixth lens element with refractive power having a concave image-side surface at a paraxial region thereof, wherein the image-side surface of the sixth lens element has at least one convex shape at a an off-axis region thereof, and both of the object-side surface and the image-side surface of the sixth lens element are aspheric;

wherein the imaging lens assembly has a total of six non-cemented lens elements with refractive power and further includes a stop located between an imaged object and the first lens element, wherein a distance in parallel with an optical axis from a maximum effective diameter position on the object-side surface of the first lens element to an axial vertex on the object-side surface of the first lens element is SAG11, a shortest non-axial distance in parallel with the optical axis between the object-side surface of the first lens element and the image-side surface of the first lens element is ET1, a curvature radius of an object-side surface of the second lens element is R3, a curvature radius of the image-side surface of the second lens element is R4, an axial distance between the fifth lens element and the sixth lens element is T56, a central thickness of the sixth lens element is CT6, and the following relationships are satisfied:

$1.75 < SAG11/ET1$;

$−0.2 < (R3+R4)/(R3−R4) < 5$; and $0 < T56/CT6 < 0.65$.

2. The imaging lens assembly of claim 1, wherein a focal length of the first lens element is f1, a focal length of the second lens element is f2, a focal length of the third lens element is f3, a focal length of the fourth lens element is to f4, a focal length of the fifth lens element is f5, a focal length of the sixth lens element is f6, and the following relationship is satisfied:

$\Sigma |f1/fx| < 3.0$, wherein $x = 2\sim 6$.

3. The imaging lens assembly of claim 2, wherein the axial distance between the fifth lens element and the sixth lens element is T56, the central thickness of the sixth lens element is CT6, and the following relationship is satisfied:

$0.05 < T56/CT6 < 0.60$.

4. The imaging lens assembly of claim 2, wherein a central thickness of the first lens element is CT1, the shortest non-axial distance in parallel with the optical axis between the object-side surface of the first lens element and the image-side surface of the first lens element is ET1, and the following relationship is satisfied:

$2.2 < CT1/ET1 < 4.5$.

5. The imaging lens assembly of claim 2, wherein an Abbe number of the first lens element is V1, an Abbe number of the second lens element is V2, an Abbe number of the fifth lens element is V5, and the following relationship is satisfied:

$$0.7<(V2+V5)/V1<1.2.$$

6. The imaging lens assembly of claim 2, wherein the fourth lens element with positive refractive power has a convex image-side surface.

7. The imaging lens assembly of claim 2, wherein the object-side surface of the sixth lens element is convex.

8. The imaging lens assembly of claim 7, wherein the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, and the following relationship is satisfied:

$$1.0<\Sigma|f1/fx|<2.75, \text{wherein } x=2\sim6.$$

9. The imaging lens assembly of claim 7, wherein an f-number of the imaging lens assembly is Fno, and the following relationship is satisfied:

$$1.6<Fno<2.2.$$

10. The imaging lens assembly of claim 2, wherein a curvature radius of the image-side surface of the sixth lens element is R12, a focal length of the imaging lens assembly is f, and the following relationship is satisfied:

$$0.15<R12/f<0.80.$$

11. The imaging lens assembly of claim 10, wherein the curvature radius of the object-side surface of the second lens element is R3, the curvature radius of the image-side surface of the second lens element is R4, and the following relationship is satisfied:

$$0.5<(R3+R4)/(R3-R4)<3.5.$$

12. The imaging lens assembly of claim 1, wherein the distance in parallel with the optical axis from the maximum effective diameter position on the object-side surface of the first lens element to the axial vertex on the object-side surface of the first lens element is SAG11, the shortest non-axial distance in parallel with the optical axis between the object-side surface of the first lens element and the image-side surface of the first lens element is ET1, and the following relationship is satisfied:

$$1.85<SAG11/ET1<5.0.$$

13. The imaging lens assembly of claim 12, wherein an axial distance between the object-side surface of the first lens element and an image plane is TTL, a focal length of the imaging lens assembly is f, and the following relationship is satisfied:

$$0.90<TTL/f<1.33.$$

14. The imaging lens assembly of claim 1, further comprising:
at least one stop located between the first lens element and an image plane.

15. The imaging lens assembly of claim 14, wherein an axial distance between the second lens element and the third lens element is T23, a central thickness of the second lens element is CT2, and the following relationship is satisfied:

$$1.0<T23/CT2<3.0.$$

16. The imaging lens assembly of claim 14, wherein at least one of an object-side surface and an image-side surface of the third lens element has at least one inflection point.

17. The imaging lens assembly of claim 1, wherein the first lens element, the second lens element, the third lens element, the fourth lens element, and the fifth lens element all have at least one surface being aspheric.

18. The imaging lens assembly of claim 17, wherein a focal length of the imaging lens assembly is f, a focal length of the fifth lens element is f5, a focal length of the sixth lens element is f6, and the following relationship is satisfied:

$$-2.0<(f/f5)+(f/f6)<-0.50.$$

19. An image capturing device having the imaging lens assembly according to claim 1, the image capturing device comprising:
an image sensor for image formation.

* * * * *

UNITED STATES PATENT AND TRADEMARK OFFICE
CERTIFICATE OF CORRECTION

PATENT NO.       : 8,854,745 B1
APPLICATION NO.  : 13/888375
DATED            : October 7, 2014
INVENTOR(S)      : Wei-Yu Chen It is certified that error appears in the above-identified patent and that said Letters Patent is hereby corrected as shown below:

In the Specification
(1) In column 3, lines 58-61, DETAILED DESCRIPTION of the issued patent reads as "... in parallel with an optical axis from a maximum effective diameter position on the object-side surface of the first lens element to an axial vertex on the object-side surface of the first lens element is SAG11 ...", but it should read as "... in parallel with an optical axis from an axial vertex on the object-side surface of the first lens element to a maximum effective diameter position on the object-side surface of the first lens element is SAG11 ...".
(2) In column 7, lines 13-17, 1st Embodiment of the issued patent reads as "... in parallel with an optical axis from a maximum effective diameter position on the object-side surface 111 to an axial vertex on the object-side surface 111 of the first lens element 110 is SAG11 ...", but it should read as "... in parallel with an optical axis from an axial vertex on the object-side surface 111 to a maximum effective diameter position on the object-side surface 111 of the first lens element 110 is SAG11 ...".
In the Claims
(3) In column 25, line 67 - column 26, line 26, Claim 1 of the issued patent appears as "... in parallel with an optical axis from a maximum effective diameter position on the object-side surface of the first lens element to an axial vertex on the object-side surface of the first lens element is SAG11, ...", but it should read as "... in parallel with an optical axis from an axial vertex on the object-side surface of the first lens element to a maximum effective diameter position on the object-side surface of the first lens element is SAG11, ...".
(4) In column 26, line 45, Claim 2 of the issued patent reads as "... a focal length of the fourth lens element is to f4, ...", but it should read as "... a focal length of the fourth lens element is f4, ...".
(5) In column 27, line 3, Claim 5 of the issued patent reads as "0.7 < (V2+V5)N/V1 < 1.2", but it should read as "0.7 < (V2+V5)/V1 < 1.2".
(6) In column 27, lines 37-40, Claim 12 of the issued patent appears as "... in parallel with the optical from the maximum effective diameter position on the object-side surface of the first lens element to the axial vertex on the object-side surface of the first lens element is SAG11, ...", but it should read as "... in parallel with the optical from the axial vertex on the object-side surface of the first lens element to the maximum effective diameter position on the object-side surface of the first lens element is SAG11, ...".

Signed and Sealed this
Tenth Day of February, 2015

Michelle K. Lee
*Deputy Director of the United States Patent and Trademark Office*

UNITED STATES PATENT AND TRADEMARK OFFICE
CERTIFICATE OF CORRECTION

PATENT NO. : 8,854,745 B1
APPLICATION NO. : 13/888375
DATED : October 7, 2014
INVENTOR(S) : Wei-Yu Chen It is certified that error appears in the above-identified patent and that said Letters Patent is hereby corrected as shown below:

IN THE SPECIFICATION (1) In column 2, lines 3-6 of the issued patent reads as "a shortest non-axial distance in parallel with the optical axis between the object-side surface of the first lens element and the image-side surface of the first lens element is ET1", but it should read as "a shortest non-axial distance in parallel with the optical axis between an effective area of the object-side surface of the first lens element and an effective area of the image-side surface of the first lens element is ET1".

(2) In column 3, line 64 to column 4, line 6 of the issued patent reads as "a shortest non-axial distance in parallel with the optical axis between the object-side surface of the first lens element and the image-side surface of the first lens element is ET1 (The range of ET1 is not limited to the effective area on both of the object-side surface and the image-side surface of the first lens element. In addition, ET1 is not referred to as an axial distance in parallel with the optical axis between the object-side surface of the first lens element and the image-side surface of the first lens element)", but it should read as "a shortest non-axial distance in parallel with the optical axis between an effective area of the object-side surface of the first lens element and an effective area of the image-side surface of the first lens element is ET1".

(3) In column 4, lines 41-43 of the issued patent reads as "the shortest non-axial distance in parallel with the optical axis between the object-side surface of the first lens element and the image-side surface of the first lens element is ET1", but it should read as "the shortest non-axial distance in parallel with the optical axis between an effective area of the object-side surface of the first lens element and an effective area of the image-side surface of the first lens element is ET1".

(4) In column 7, lines 17-20 of the issued patent reads as "a shortest non-axial distance in parallel with the optical axis between the object-side surface 111 of the first lens element 110 and the image-side surface 112 of the first lens element 110 is ET1", but it should read as "a shortest non-axial distance in parallel with the optical axis between the effective area of the object-side surface 111 of the first lens element 110 and the effective area of the image-side surface 112 of the first lens element 110 is ET1".

Signed and Sealed this
Twenty-fourth Day of November, 2015

Michelle K. Lee
*Director of the United States Patent and Trademark Office*

CERTIFICATE OF CORRECTION (continued)
U.S. Pat. No. 8,854,745 B1

IN THE CLAIMS (5) In column 26, lines 26-29, claim 1 of the issued patent read as "a shortest non-axial distance in parallel with the optical axis between the object-side surface of the first lens element and the image-side surface of the first lens element is ET1", but it should read as "a shortest non-axial distance in parallel with the optical axis between an effective area of the object-side surface of the first lens element and an effective area of the image-side surface of the first lens element is ET1".

(6) In column 26, lines 59-62, claim 4 of the issued patent reads as "the shortest non-axial distance in parallel with the optical axis between the object-side surface of the first lens element and the image-side surface of the first lens element is ET1", but it should read as "the shortest non-axial distance in parallel with the optical axis between the effective area of the object-side surface of the first lens element and the effective area of the image-side surface of the first lens element is ET1".

(7) In column 27, line 40 to column 28, line 3, claim 12 of the issued patent reads as "the shortest non-axial distance in parallel with the optical axis between the object-side surface of the first lens element and the image-side surface of the first lens element is ET1", but it should read as "the shortest non-axial distance in parallel with the optical axis between the effective area of the object-side surface of the first lens element and the effective area of the image-side surface of the first lens element is ET1".